Figure 1:
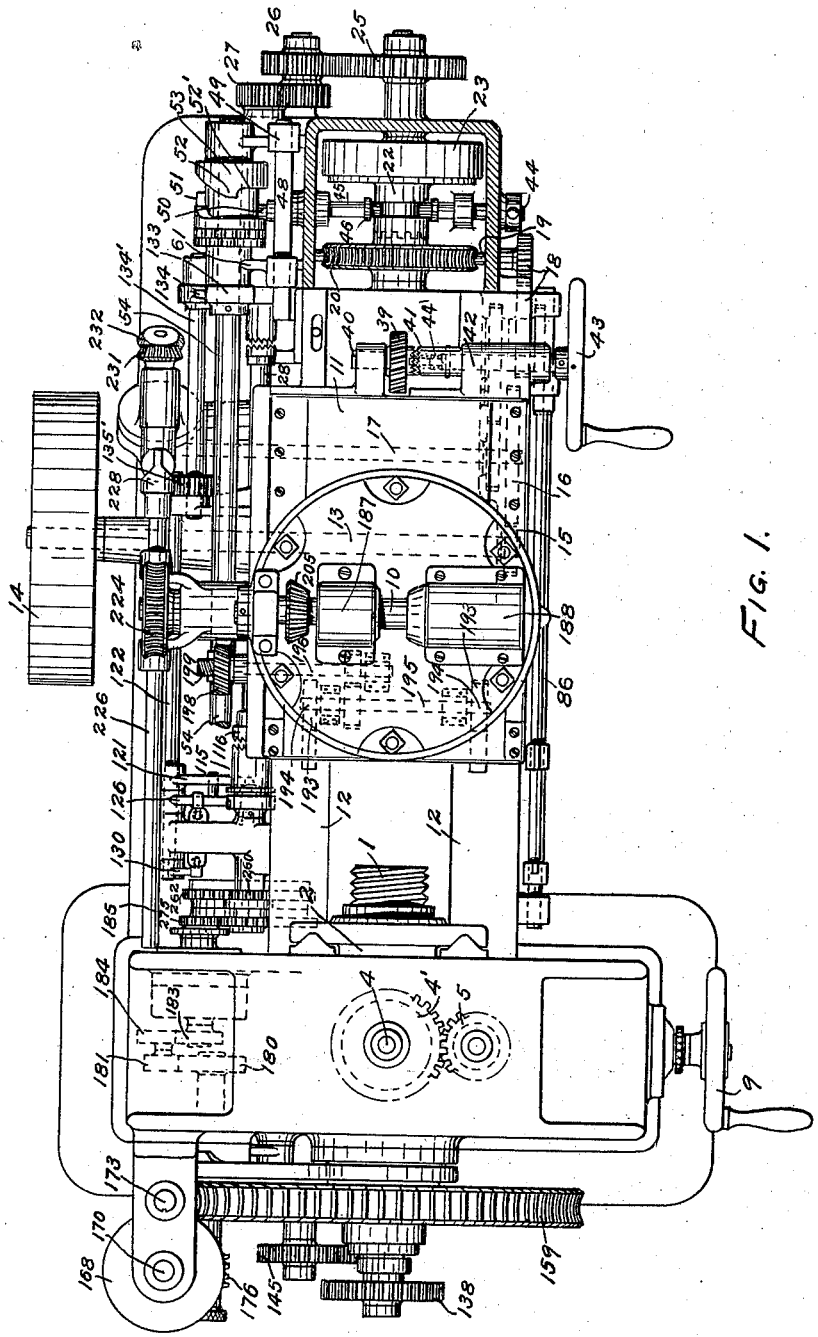

No. 645,082. Patented Mar. 13, 1900.
C. R. GABRIEL.
GEAR CUTTING MACHINE.
(Application filed Dec. 2, 1898.)
(No Model.) 10 Sheets—Sheet 1.

WITNESSES,
R. A. Bates
Ira L. Fish

INVENTOR,
Charles R. Gabriel
BY Wilmarth H. Thurston
ATT'Y.

No. 645,082. Patented Mar. 13, 1900.
C. R. GABRIEL.
GEAR CUTTING MACHINE.
(Application filed Dec. 2, 1898.)
(No Model.) 10 Sheets—Sheet 2.

WITNESSES, INVENTOR,
R. A. Bates Charles R. Gabriel
Ira L. Fish BY Wilmarth H. Thurston
ATT'Y.

No. 645,082. Patented Mar. 13, 1900.
C. R. GABRIEL.
GEAR CUTTING MACHINE.
(Application filed Dec. 2, 1898.)

(No Model.) 10 Sheets—Sheet 3.

WITNESSES,
R. A. Bates
Iva L. Fish

INVENTOR,
Charles R. Gabriel
BY Wilmarth H. Thurston
ATT'Y.

No. 645,082. Patented Mar. 13, 1900.
C. R. GABRIEL.
GEAR CUTTING MACHINE.
(Application filed Dec. 2, 1898.)
(No Model.) 10 Sheets—Sheet 4.

WITNESSES, INVENTOR,
R. A. Bates Charles R. Gabriel
Ira L. Fish BY Wilmarth H. Thurston
ATT'Y.

No. 645,082. Patented Mar. 13, 1900.
C. R. GABRIEL.
GEAR CUTTING MACHINE.
(Application filed Dec. 2, 1898.)
(No Model.) 10 Sheets—Sheet 5.

WITNESSES, INVENTOR,
R. A. Bates Charles R. Gabriel
Ira L. Fish By Wilmarth H. Thurston
ATT'Y.

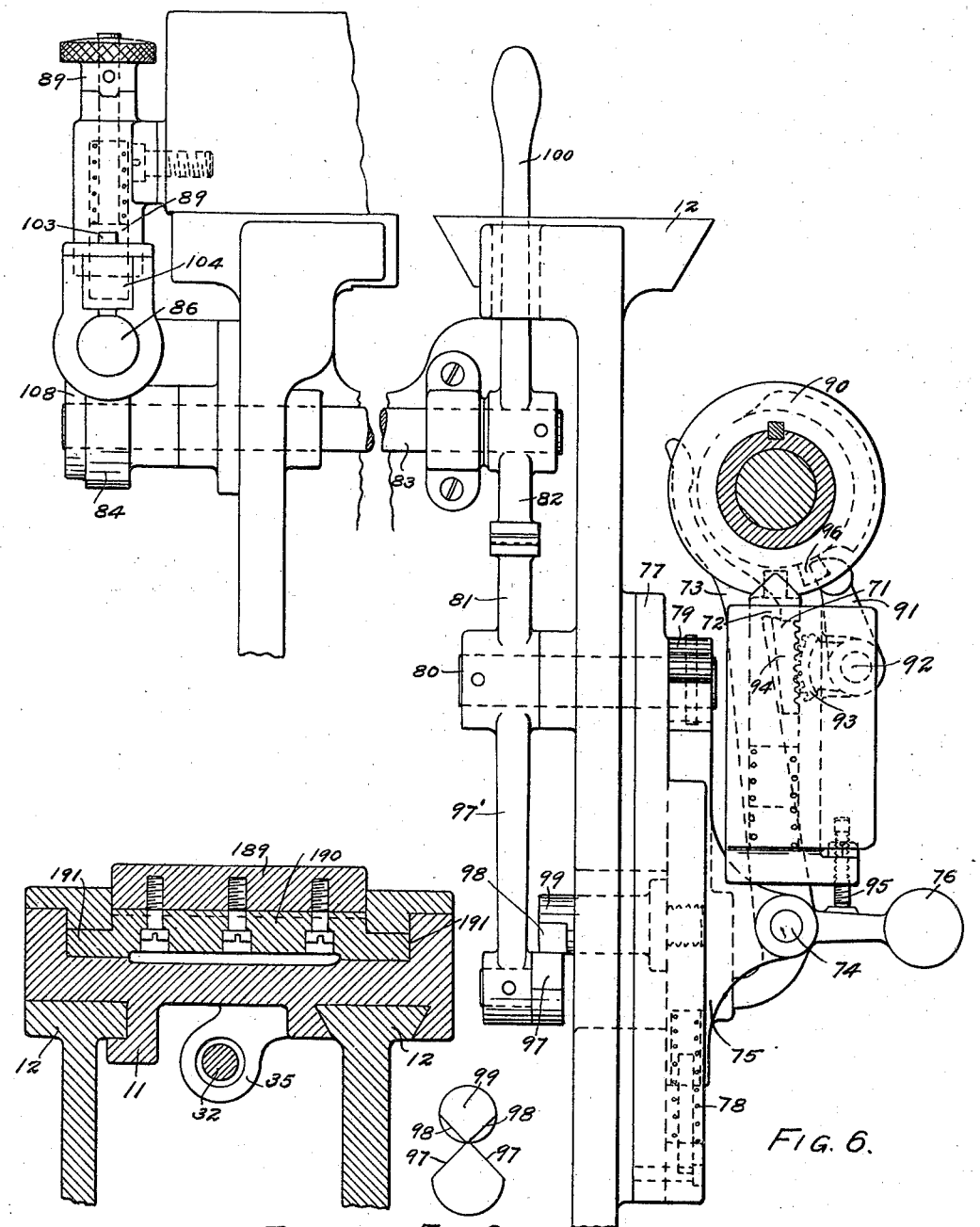

No. 645,082. Patented Mar. 13, 1900.
C. R. GABRIEL.
GEAR CUTTING MACHINE.
(Application filed Dec. 2, 1898.)
(No Model.) 10 Sheets—Sheet 7.
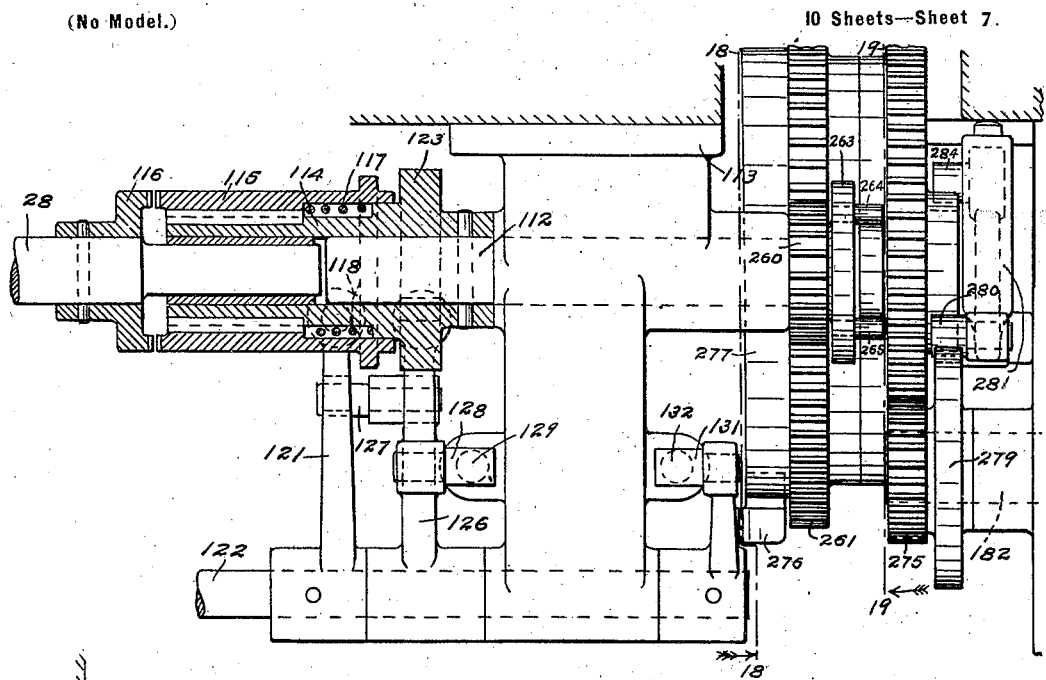
WITNESSES,
R. A. Bates
Ira L. Fish
INVENTOR,
Charles R. Gabriel
BY Wilmarth H. Thurston
ATT'Y.

No. 645,082. Patented Mar. 13, 1900.
C. R. GABRIEL.
GEAR CUTTING MACHINE.
(Application filed Dec. 2, 1898.)

(No Model.) 10 Sheets—Sheet 8.

WITNESSES,
R. A. Bates
Ira L. Fish

INVENTOR,
Charles R. Gabriel
BY Wilmarth H. Thurston
ATT'Y.

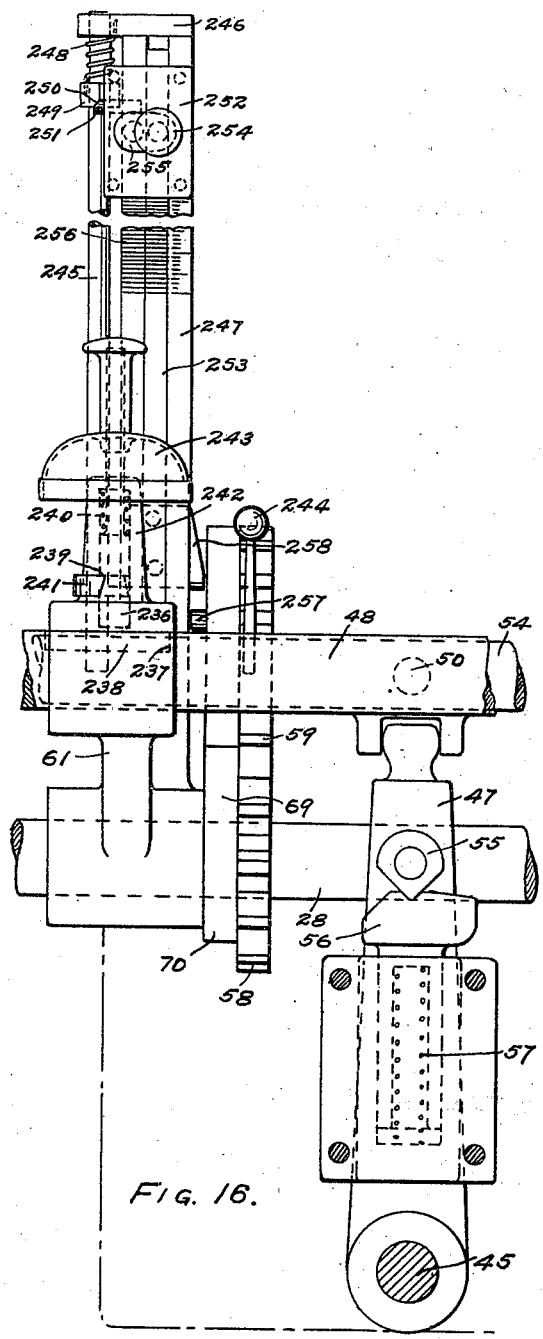

No. 645,082. Patented Mar. 13, 1900.
C. R. GABRIEL.
GEAR CUTTING MACHINE.
(Application filed Dec. 2, 1898.)
(No Model.) 10 Sheets—Sheet 10.
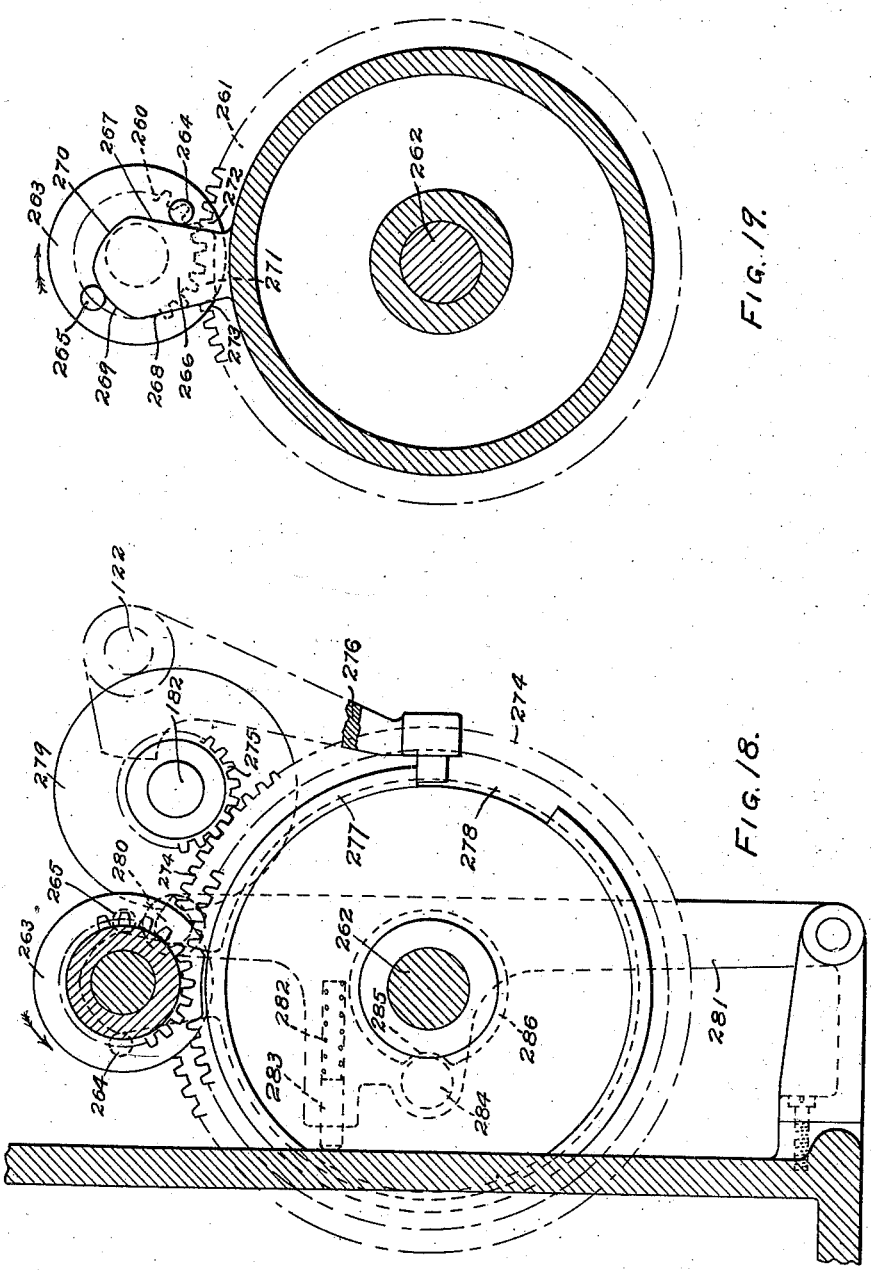
WITNESSES, INVENTOR,
R. A. Bates Charles R. Gabriel
Ira L. Fish By Wilmarth H. Thurston
ATTY.

UNITED STATES PATENT OFFICE.

CHARLES R. GABRIEL, OF PROVIDENCE, RHODE ISLAND, ASSIGNOR TO THE BROWN & SHARPE MANUFACTURING COMPANY, OF SAME PLACE.

GEAR-CUTTING MACHINE.

SPECIFICATION forming part of Letters Patent No. 645,082, dated March 13, 1900.

Application filed December 2, 1898. Serial No. 698,095. (No model.)

*To all whom it may concern:*

Be it known that I, CHARLES R. GABRIEL, of the city and county of Providence and State of Rhode Island, have invented certain new and useful Improvements in Gear-Cutting Machines; and I do hereby declare the following specification, taken in connection with the accompanying drawings, forming a part of the same, to be a full, clear, and exact description thereof.

The invention relates to machines for cutting the teeth upon gear-blanks, and more especially to machines for cutting spiral gears, although certain of the combinations forming features of invention may be embodied in machines for cutting other forms of gearing.

The primary object of the invention is to provide an efficient machine for cutting spiral gears in which the various operations are automatically performed; and a further object is to provide a machine of this character which is adapted to cut spiral gears of varying pitch, diameter, and lead.

In cutting spiral gears the gear-blank is secured upon a rotary support and is acted upon by a rotary cutter the axis of which is at an angle to the axis of the gear-blank, depending upon the diameter of the gear-blank and the lead of the teeth to be cut. The blank is rotated and either the cutter-support or the blank-support advanced in a direction parallel to the axis of the blank, so that the center of the cutter always lies in the same plane passing through the axis of the blank. The rotary movement of the work is in a definite ratio to the advance movement between the cutter and work, which ratio depends upon the lead of the gear being cut, and this ratio is preferably accurately maintained by gearing the work-support to the reciprocating support. On the return movement of the reciprocating support the cutter should be out of cutting relation, and this is preferably accomplished by moving the cutter out of cutting relation, although, so far as certain features of invention are concerned, it may be accomplished by moving the blank-support. After each cut the blank is given a partial rotation or indexed to bring the blank into position for the next cut, and the mechanism for thus indexing the blank is preferably so constructed that the blank is indexed without disconnecting the mechanism which rotates the blank during the action of the cutter.

Figure 2:
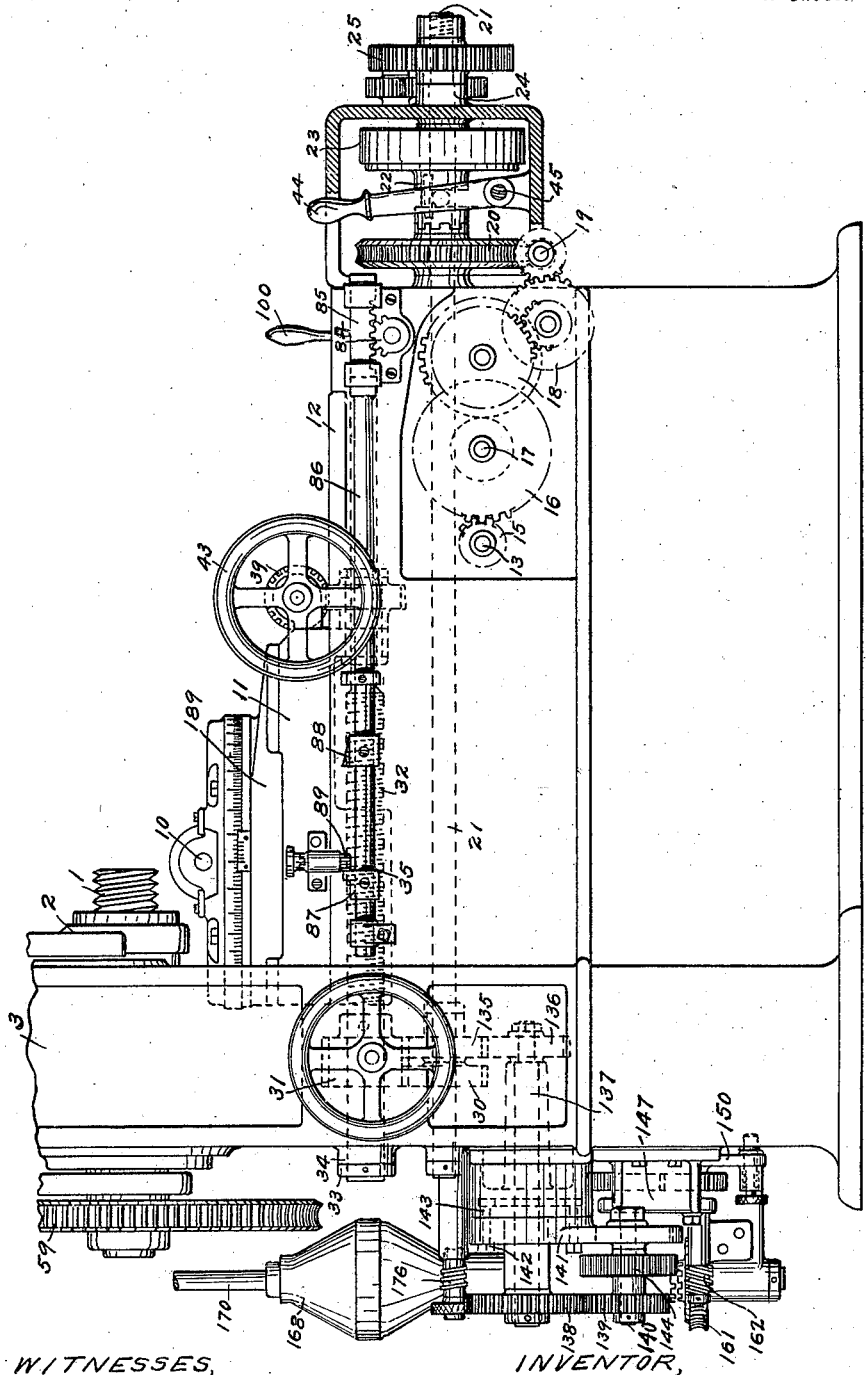
Figure 3:
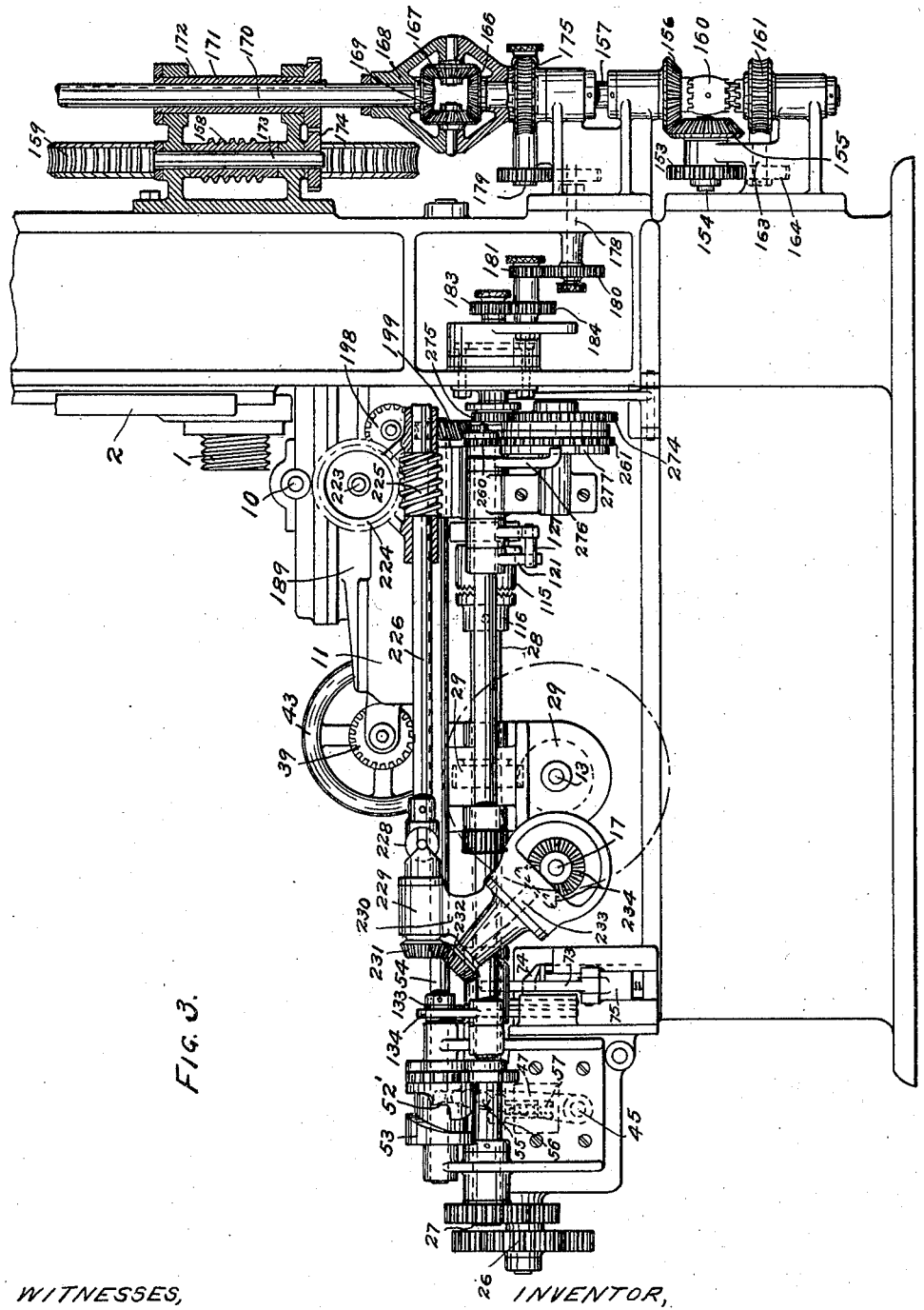
Figure 4:
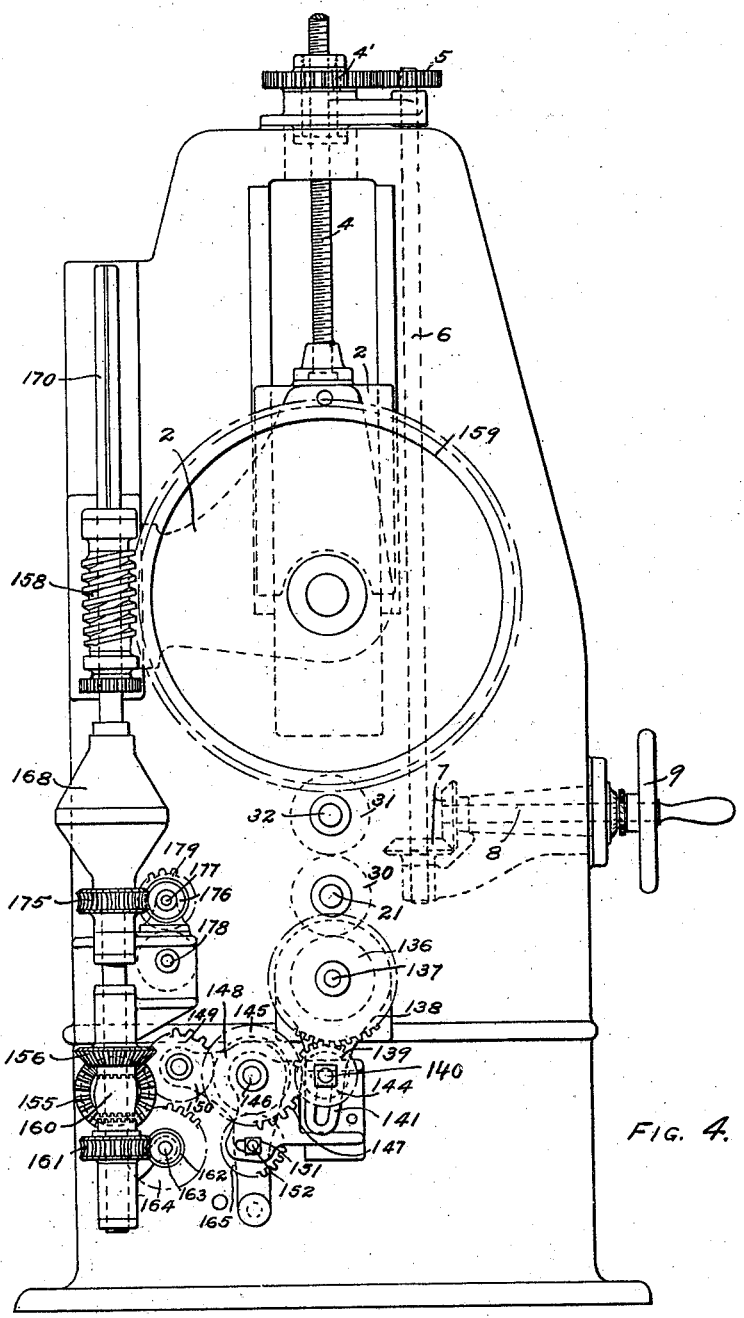
Figure 5:
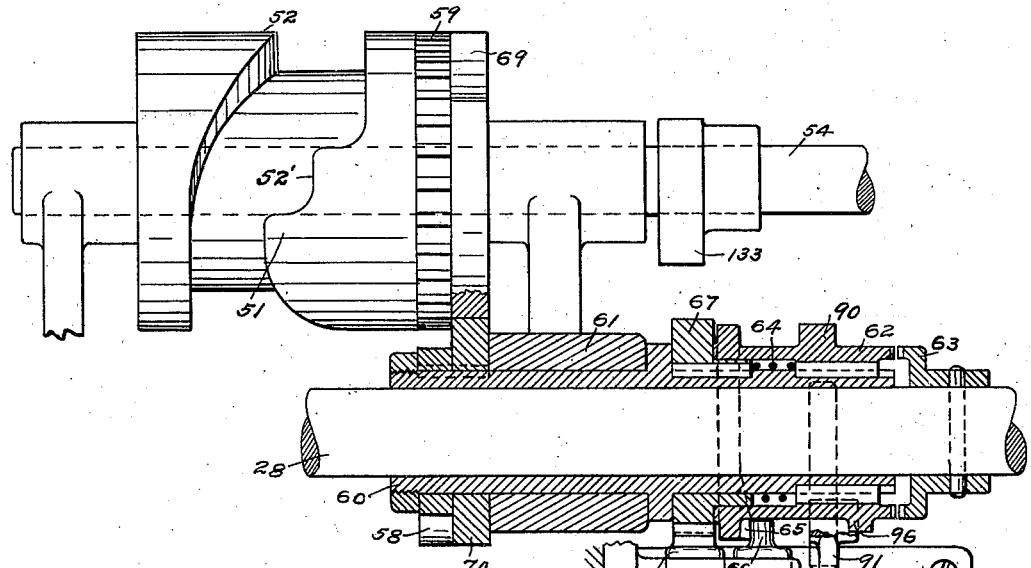
Figure 7:
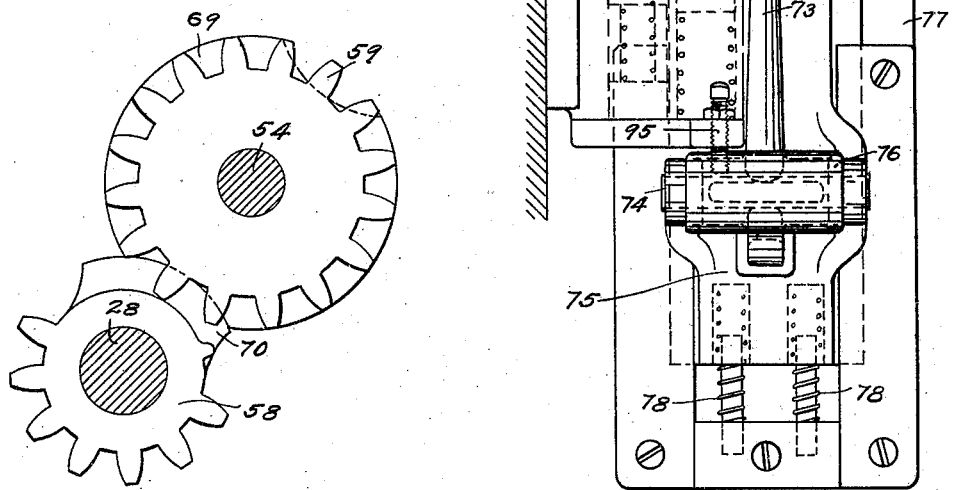
Figure 11:
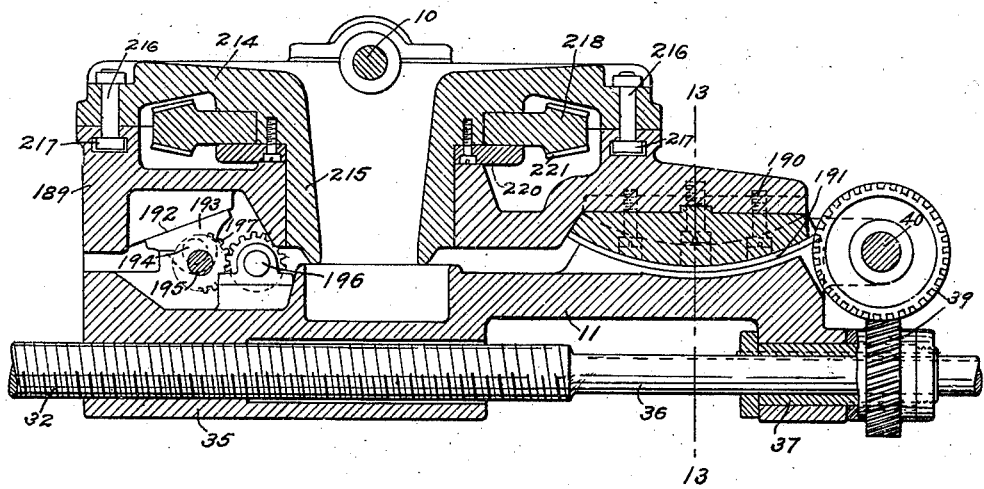
Figure 12:
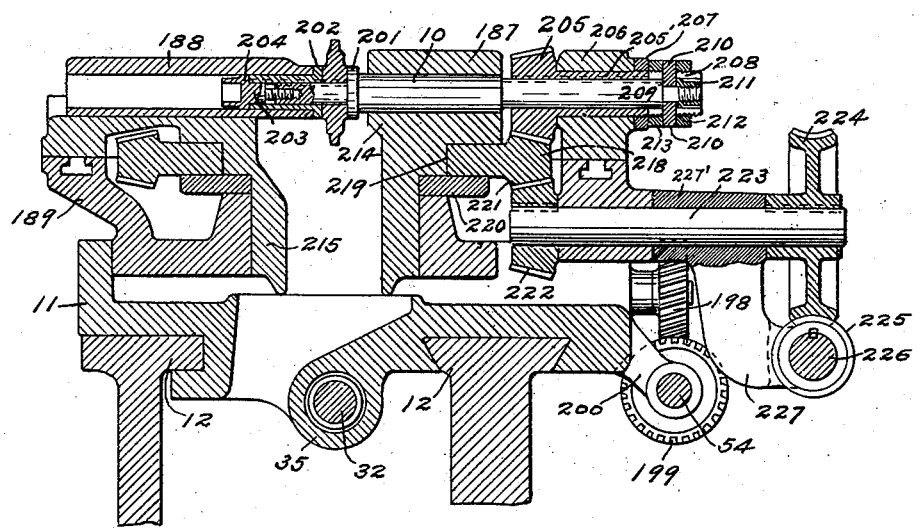

In the accompanying drawings, in which is illustrated a machine which embodies all the features of invention in their preferred forms, Figure 1 is a plan view, the cutter-shaft being in the position it would occupy were the machine to be used in cutting spur-gears. Figs. 2 and 3 are front and rear elevations, respectively, the cutter-carriage being shown in its advanced position in these views for the sake of clearness in showing other parts of the machine. Fig. 4 is an end elevation. Figs. 5, 6, 7, and 8 are details of the mechanism for reversing the carriage. Figs. 9 and 10 are details of the indexing mechanism. Figs. 11 and 12 are sectional views of the cutter-carriage. Fig. 13 is a sectional view on line 13 13, Fig. 11. Figs. 14 and 15 are details of a safety mechanism to be described. Figs. 16 and 17 are details showing a mechanism for automatically stopping the operation of the cutter-carriage. Fig. 18 is a sectional view on line 18 18, Fig. 9; and Fig. 19 is a sectional view on line 19 19, Fig. 9.

Referring to the drawings in detail, the gear-blank is supported upon a spindle 1, journaled in a block 2, mounted for vertical adjustment in the standard 3. A screw-rod 4 is connected to the block 2 and passes through an internally-threaded gear 4' at the top of standard 3, which gear is engaged by a gear 5 on a vertical shaft 6. The shaft 6 is geared by means of bevel-gears 7 to a shaft 8, provided with a crank-wheel 9, by turning which the block 2 may be moved vertically to bring the gear-blank into proper relation to the cutter. The cutter is secured to a shaft 10, carried by the cutter-carriage 11 and continuously driven by mechanism to be described. The carriage 11 is mounted to reciprocate on ways 12, which are parallel to the axis of the blank-spindle 1, so that the movement of the cutter-carriage is always in a direction parallel to the axis of the blank.

The various mechanisms of the machine are operated from a continuously-running driving-shaft 13, which extends transversely of the machine and is provided with driving-pulley 14. At the opposite end of the shaft 13 a gear 15 is secured, which engages and drives a gear 16, secured to a second transverse shaft 17. The shaft 17 is connected, through a series of change-gears 18, with a worm-shaft 19, which carries a worm engaging a worm-wheel 20, loosely mounted on a shaft 21. The hub of the worm-wheel is provided with clutch-teeth, which are arranged to be engaged by clutch-teeth on a clutch-sleeve 22, keyed to slide on the shaft 21 in a common manner. The clutch-sleeve also carries one member of a friction-clutch, the other member of which consists of a disk 23, loosely mounted on the shaft 21. The hub of disk 23 extends through the bearing 24 and has a gear 25 secured thereto. The gear 25 forms one of a train of change-gears 26, one of which, 27, is secured to the end of a shaft 28, extending along the side of the frame and continuously driven from the driving-shaft 13 by spiral gears 29. (See dotted lines, Fig. 3.)

The arrangement of gearing is such that the worm-wheel 20 and disk 23 are continuously driven in opposite directions, and the shaft 21 will therefore be revolved in one direction or the other, according as the clutch-sleeve 22 engages the worm-wheel or the disk. When the worm-wheel is acting as the driver, the cutter-carriage is advanced to feed the cutter through the gear-blank, and when the disk acts as the driver the carriage is quickly returned. The speed of the feed and return may be varied by changing the gearing connecting the disk and worm-wheel with the driving-shaft. The shaft 21 extends longitudinally through the machine and carries a gear 30 near its rear end, which gear engages a similar gear 31, secured to a screw-threaded rod or shaft 32, journaled in the frame. The rod 32 is provided with a collar 33, which engages a boss 34 on the frame and prevents longitudinal movement of the rod. The carriage 11 is provided with a nut 35, which is engaged by the thread of the screw 32, so that the carriage is moved on its ways as the shaft 21 and screw 32 are rotated. It will be noted that with the arrangement described the screw 32 draws the carriage forward during the cutting instead of thrusting said carriage forward, so that there is no springing or vibrating of the screw, and thus the movement of the carriage is more steady and uniform.

The screw-rod 32 is reduced in diameter beyond the nut 35 at 36 and passes through a sleeve 37, mounted in the carriage 11, Fig. 11. The sleeve 37 is connected with the screw-rod by means of a key and keyway, and a spiral gear 38 is secured to said sleeve, which is engaged by a spiral gear 39, secured to a short shaft 40, mounted in the carriage 11. The hub of gear 39 is provided with a clutch-face, which is arranged to be engaged by a clutch-face on a collar 41, secured to a shaft 42, which is mounted in the carriage 11 and is in line with shaft 40. The shaft 42 carries a hand-wheel 43 at its outer end, and said shaft may be moved longitudinally to engage the clutch-faces, which are normally held disengaged by a spring 44'. By engaging the clutch-faces and turning the hand-wheel the carriage may be moved upon its ways manually. By thus mounting the means for manually operating the carriage upon the carriage the said means will always be readily accessible and the operator may stand where he can conveniently watch the action of the cutter when he is operating the carriage by hand.

The clutch-sleeve 22 is shifted from one driver to the other to reverse the movement of the carriage by mechanism controlled by the movement of the carriage, which mechanism is as follows: A rock-shaft 45 is mounted below the clutch-sleeve and carries a yoke 46, the ends of which engage a groove in said sleeve. One end of said shaft carries a handle 44 for manually operating the clutch-sleeve, and the other end of said shaft carries a lever 47, the upper end of which engages a recess in a bar 48. The bar 48 is mounted to slide in guides 49 and is provided with a laterally-extending roll or pin 50, which is engaged by cams 51 and 52, formed on a drum 53. The drum 53 is secured to a shaft 54, which normally stands stationary, but is given a half-revolution at suitable intervals, during which half-revolution the cams 51 and 52 act to shift the clutch-sleeve first in one direction and then in the other. Since the clutch which connects the worm-wheel 20 and the sleeve 22 is a positive clutch, the cam 52 is so constructed that it will not shift said sleeve far enough to bring the clutch-teeth into engagement, and a spring is provided for completing the throw of the sleeve to prevent landing of the teeth. As shown, the lever 47 is provided with a pin 55, having a V-shaped under side, which rides on a shoe 56, provided with an inclined side. The shoe is pressed upward by a spring 57. When the cam 52 moves the lever 47 to shift the clutch-sleeve 22 into engagement with the worm-wheel 20, the under edge of the pin 55 passes by the inclined side of the shoe 56 just as the cam completes its throw, and the clutch-sleeve is forced yieldingly toward the worm-wheel by the action of said incline on the pin. In order to prevent the operator from throwing the clutch-sleeve 22 out of time with cams 51 and 52 when he is operating said sleeve manually, the drum 53 is provided with two stops 52', one of which always stands in the path of roll 50 when shaft 54 is at rest and prevents the shifting of the clutch-sleeve beyond the mid-position.

The shaft 54 is rotated at proper intervals by means of an interrupted gear 58, which engages a gear 59, secured to said shaft. The interrupted gear is secured to a sleeve 60, mounted in a bracket 61 and surrounding the continuously-running shaft 28. A clutch-sleeve 62 is keyed to slide on the sleeve 60 and is provided with clutch-teeth arranged to engage teeth formed on a collar 63, secured to shaft 28. The sleeve 62 is forced toward the collar by a spring 64 and is held back against the force of the spring by a cam 65 on said sleeve, which engages an abutment in the form of a spring-pressed pin or slide 66. A locking-disk 67 is secured to sleeve 60 and is provided with a V-shaped notch, which is engaged by the V-shaped end of a spring-pressed locking-pin 68. A disk 69 is secured to the shaft 54 and is provided with two segmental recesses, which are alternately engaged by a segment 70, secured to sleeve 60. Thus the shaft 54 is securely held from rotation when not being revolved by the interrupted gear. The pin 66 is withdrawn to allow the clutch-teeth on said sleeve to engage the teeth on collar 63 through the following mechanism: The pin is provided with a shoulder 71, which is engaged by a hook or latch 72, formed on an arm 73, pivoted at 74 to a slide 75. The arm 73 is provided with a weight 76, which tends to hold said arm against the shoulder 71. The slide 75 is guided in a plate 77, secured to the frame, and is pressed upward by springs 78. The top of said slide is engaged by the ends of a rocker-arm 79, secured to the end of a rock-shaft 80, journaled in the frame and having a gear-segment 81 secured thereto. The segment 81 is engaged by a segment 82, secured to one end of a transverse rock-shaft 83, the other end of which carries a gear segment or pinion 84. The gear-segment 84 is engaged by a rack 85 on a reversing-bar 86, guided in suitable guides at the side of the frame. The bar 86 is provided with two adjustable dogs 87 and 88, which are arranged to be engaged by a pin 89 on the carriage.

The operation of the reversing mechanism is as follows: When the carriage strikes the lug 87 or lug 88, the bar 86 is moved longitudinally and through the rack 85, segment 84, shaft 83, and segments 82 and 81 rocks the shaft 80. When the shaft 80 rocks, one end of the rocker 79 forces the slide 75 down, thus causing the latch 72 to draw down the pin 65 and allow the spring 64 to force the sleeve 62 into engagement with the collar 63. The sleeve 62 and sleeve 60 now begin to revolve, and a cam 90 on the sleeve 62 strikes the upper end of the arm 73, rocking said arm and disengaging the latch 72 from the shoulder 71, thus allowing the pin 66 to spring back into the path of cam 65. When the sleeves 62 and 60 have made one revolution, the cam 65 strikes the pin 66 and disengages the sleeve 62 and collar 63. When the sleeve 60 starts, the pin 68 is forced down and rides on the disk 67 until the sleeve has made a single revolution, when it again engages the notch in said disk. During the revolution of the sleeve 60 the segment 70 moves out of the segmental recess in disk 69 and the interrupted gear revolves the shaft 54 a half-revolution, the segment then entering the other segmental recess and moving around to the position shown in Fig. 7. It will be seen that the segmental gear has ceased to act upon the gear 69 before the cam 65 engages the pin 66 and that at the time the clutch-teeth are disengaged the sleeve 60 is running idly, thus insuring the proper disengagement of the teeth. To guard against any failure of the spring to force the pin 66 up into position, means are provided for positively operating said pin. The means may be used in lieu of the spring; but it is preferred to use the spring and to use the positive means merely as a safety device to act in case the spring should be broken or fail to act. As shown, the positive means consists of a lever 91, pivoted at 92 and having its upper end in the path of cam 90 and having a segment 93 on its other end, which engages a rack 94, projecting laterally from the pin 66. Should the spring fail to force up the pin 66, the cam 90 will strike the end of lever 91 and rock said lever, thus lifting the pin 66 into the path of cam 65. Should the weight 76 fail to rock the arm 73 and move the latch 72 into position, then the arm will be positively rocked by engaging the bolt 95, when the slide 75 rises. Should the spring 64 fail to fully engage the clutch-teeth on sleeve 62 and collar 63, then a cam 96 on the sleeve 62 will engage the end of lever 91 and force said sleeve over to engage said clutch-teeth. Should the springs 78 fail to lift the slide 75, then said slide will be positively lifted by one of the cam-surfaces 97, carried by an arm 97', depending from the shaft 80 and arranged to engage cam-surfaces 98 on a pin 99, projecting from slide 75. Any or all of these positive means for operating the parts may be used in place of the springs or weight, or any or all may be dispensed with; but it is preferred to use the springs and weight and to provide the positive devices to act as safety devices. A handle 100 is secured to the shaft 83 and extends up above the ways 12, so that the reversing mechanism may be thrown into operation manually. After the reversing mechanism has been thrown into action by the pin 89 striking either of the dogs—say 87, for instance—the rocker 79 returns to its normal position as the pin moves away from the dog in order to allow the slide 75 to rise and bring the catch 72 above the shoulder 71. This movement of the rocker causes the dog to follow the pin for a short distance. Should the carriage now be reversed by operating the handle 100 before the pin 89 has moved a sufficient distance away from the dog, the pin will again move against the dog and operate the rocker before the slide 75 has returned and before the catch 72 has engaged shoulder 71, with the result that the reversing mechanism will not act, causing breakage or injury to the machine. It is therefore preferred to provide means for preventing the operation of the reversing mechanism until the pin 89 has moved away from the dog. This is preferably accomplished by providing means for preventing successive movements of the reversing-bar in the same direction, and in Figs. 14 and 15 is shown a preferred form of such a means. As shown, the reversing-bar is provided with a lug 101, the ends of which form shoulders for engaging two stops 102 103, pivoted in a slide 104, mounted above the reversing-bar and having a limited movement longitudinally in relation thereto. The stops are pivoted in a slot formed in the slide, and said slide moves under a plate 105, projecting laterally from the bracket which guides the reversing-bar. A flat spring 106 bears upon the top of slide 104 to prevent too-easy movement thereof. The stops 102 and 103 project above the ends of the plate 105, and said stops are held down upon the reversing-bar 86 by a spring 107. A cam 108 is secured to the segment 84 and is arranged to engage bearing-surfaces 109 110, formed on a plate 111, secured to the slide 104. Now supposing the carriage 11 has just been reversed and stands in the position shown in Fig. 2, with the pin 89 in engagement with the dog 87, then the parts will stand in the position shown in Figs. 14 and 15, with the stops 102 in the path of lug 101 and stop 103 held out of action by the end of plate 105. The reversing mechanism cannot now be operated, for the reason that the bar 86 is held from movement in one direction by the stop 102 and from movement in the other direction by the pin 89 and dog 87. When the pin 89 has moved a sufficient distance away from dog 87, the reversing mechanism may be operated by moving the bar 86 toward the right; but said bar cannot be moved toward the left. When the bar 86 is moved toward the right either by handle 100 or by the pin 89 striking dog 88, the shaft 83 is rocked and cam 108 engages surface 110, thus moving slide 104 to the right. This movement of the slide brings the end of stop 102 against the end of plate 105, rocking said stop out of operative position, and also carries stop 103 out of engagement with the end of plate 105, allowing said stop to drop into operative position. The stop 103 will now prevent movement of the bar 86 toward the right, and the pin 89 and dog 88 will prevent movement of said bar toward the left until the pin has moved a sufficient distance from the dog. The next movement of the bar 86 must be toward the left, which will return the parts to the position shown in Fig. 14. Thus it will be seen that the bar 86 cannot be moved successively in the same direction and that the movements of the bar are just what would be given by the action of the carriage—that is to say, the bar is moved first in one direction and then in the other, and the mechanism controlled by the bar will always be in correct time with the carriage. After each return movement of the carriage the spindle 1 must be given a partial revolution or indexed to bring the blank into position for the next cut, and since the distance through which the blank must be turned should be capable of wide variation to adapt a machine for cutting gears of widely-varying pitch the indexing mechanism should include a train of change-gearing. It has been customary in gear-cutting machines to drive the gearing of the indexing mechanism from a continuously-running shaft which is coupled to said gearing at the proper time, usually by means of a clutch, the construction being such that the gearing between the spindle and the constantly-running shaft is started at full speed when the indexing begins and is suddenly stopped while at full speed when the indexing is completed. This sudden starting and stopping of the indexing-gearing is objectionable, as it produces undue strain and wear upon the parts, tending to loosen the connections between the gears and shafts. A feature of the present invention relates to means for overcoming this difficulty and consists in providing means for starting the indexing-gearing with a gradually-increasing speed and stopping said gearing by gradually diminishing the speed, and this feature is not limited in its application to spiral-gear cutters, but may be used in other machines for effecting the indexing of the blank. The preferred form of this mechanism is shown in Figs. 1, 3, 9, 10, 18, and 19 and is as follows: A shaft 112 is mounted in a bracket 113, secured to the frame, with its axis in line with the axis of the shaft 28. A sleeve 114 is secured upon shaft 112 and projects beyond the end of said shaft, forming a bearing for the end of shaft 28. A clutch-sleeve 115 is keyed to slide on the sleeve 114 and is provided on its end with clutch-teeth arranged to engage clutch-teeth on a collar 116, secured to shaft 28. The clutch-sleeve 115 is forced toward the collar 116 by a spring 117 and is normally held out of engagement therewith by a cam 118 on said sleeve, which cam engages an abutment 119. The abutment 119 is in the form of a pin on the end of an arm 121, which is secured to a rock-shaft 122. The sleeve 114 is provided with a disk 123, having a notch 124 therein, which is engaged by a lock 125, carried by an arm 126, pivoted on shaft 122. The arm 126 is provided with a laterally-projecting pin 127, which is engaged by the arm 121. An arm 130 is secured to shaft 122 and carries a pin 131, engaged by a spring-plunger 132, which tends to hold the shaft in normal position. The shaft 122 is rocked at the proper time by a cam 133 secured to shaft 54 and engaging an arm 134', secured to a shaft 134', which is connected to shaft 122 by pinions or segments 135'. When the shaft 122 is thus rocked, the pin 119 is withdrawn from the cam and the lock 125 also withdrawn from the disk 123, and the spring 117 forces the sleeve 115 into engagement with sleeve 114, thus coupling the shafts 28 and 112 together. The shaft 112 is driven until the pin 119 is returned into the path of the cam 118, when said cam engages said abutment and disengages sleeves 114 and 115. When the arm 121 is moved to bring the pin 119 into the path of cam 118, the lock 125 rides on the disk 123 until the notch in said disk comes under said lock, when the spring-pin 129 forces said lock into said notch and the shaft 112 is held in position. The shaft 112 acts to drive the indexing-gearing through mechanism which acts to start the gearing with a gradually-increasing speed and to gradually reduce the speed when stopping the gearing. Any suitable mechanism for accomplishing this result may be employed; but it is preferred to use a form of mechanism which is novel in itself and forms the subject-matter of another application. The mechanism is as follows: A pinion 260 is secured to the end of shaft 112 and engages a mutilated gear 261, secured to a shaft 262, mounted in the bracket 113. A disk 263 is also secured to the shaft 112, so that said disk will rotate with the pinion 260, and said disk carries two abutments in the form of pins 264 and 265, arranged diametrically opposite each other and in line with the pitch-circle of pinion 260. A cam-tooth 266 is secured to rotate with the shaft 262 and is arranged to be engaged by the pins 264 and 265. The cam-tooth 266 has two radial flanks 267 and 268 and two curved faces 269 and 270. The gear 261 has a number of its teeth removed to form a blank space at 271. When the shaft 112 is at rest, the blank space 271 is opposite the pinion 260 and the cam-tooth 266 is between the pins 264 and 265, as shown in Fig. 18. When the shaft 112 revolves, the pin 264 acts on the flank 267 of the cam-tooth 266 and starts the shaft 262, the motion imparted to the shaft 262 gradually increasing in speed as the pin 264 passes through the first quadrant until, when the pin 264 reaches the line of the centers of the pinion 260 and gear 261, the gear 261 and pinion have the same linear speed. This movement of shaft 262 and gear 261 brings the tooth 272 of the gear 261 into engagement with the pinion 260, and the pinion continues to drive the gear 261 until said gear has nearly completed a single revolution, when the flank 268 engages the pin 265 and at the same time the pinion 261 leaves the tooth 273 of the gear 261. Now as the pinion 260 revolves the pin 265 acts to gradually retard the motion of shaft 262 until said shaft is finally brought to rest when the pins are in the position shown in Fig. 18. When the pin 264 is acting upon the flank 267, the pin 265 passes over face 269 and holds the pin 264 and flank 267 in engagement, and when pin 265 is engaged by flank 268 the pin 264 passes over face 270. Thus the gear 261 is started with a gradually-increasing speed and is engaged with the pinion 260 when the pitch-surfaces are moving at the same speed and after nearly completing a revolution is disengaged from said pinion and gradually brought to rest. In the mechanism shown the sizes of the pinion 263 and gear 261 and the number of teeth in each are so related and the shape of the cam-tooth 266 is so proportioned that the shaft 112 makes four revolutions in revolving shaft 262 one revolution; but it will be understood that the relative sizes of the gears and the shape of the cam-tooth may be varied so long as they are so related that the cam-tooth will be brought into proper relation to the pins on each revolution of the mutilated gear. The shaft 262 is connected with the indexing-gearing by a gear 274, secured to said shaft, which engages a gear 275, secured to a shaft 182, to be hereinafter referred to. The gear 274 is four times the diameter of gear 275, so that shaft 182 makes four revolutions for one of shaft 262.

Since in the construction shown the pinion 260 makes four revolutions in revolving shaft 262 through a single revolution, the abutment 119 should be held out of the path of the cam 118 until shaft 112 has made three revolutions and should be returned in time to engage said cam on the fourth revolution of said shaft. This is accomplished in the mechanism shown by providing the shaft 122 with an arm 276, the end of which rides on a cam 277, which is carried by the shaft 262, being in the form of a flange projecting from the gear 261. This flange is cut away at 278, and when the shaft 122 is in its normal position the end of arm 276 lies in the recess thus formed. When the shaft 122 is rocked, the end of arm 270 is moved out of the recess and rides on the cam 277 until shaft 262 has nearly completed its revolution, when said cam passes from under said arm, allowing the shaft 122 to return to its normal position and bring the pin 119 into the path of cam 118. The shaft 182 may be provided with a locking-disk 279, having a notch which is engaged by a pin 280, carried by a pivoted lever 281. The pin is held yieldingly in the notch by a spring 282 acting against a pin 283, which engages the frame of the machine. The lever 281 also carries a roll 284, which normally stands in a recess 285, formed in a cam 286, secured to shaft 262. When the shaft 262 is revolved, the cam-roll 284 rides on cam 286, thus preventing the pin 280 from engaging the notch in disk 279 until the shaft 262 has completed its revolution.

The mechanism thus far described and the features of novelty embodied therein are not limited in their application to machines for cutting spiral gears, but may be embodied in machines for cutting other forms of gears or in various classes of machines.

In cutting spiral gears the gear-blank must be rotated as the cutter advances, and the rotary movement must have a constant ratio to the advance of the cutter. Any suitable mechanism may be used for obtaining this motion; but it is preferred to employ a mechanism in which the blank-spindle is connected by positive gearing with the cutter-carriage, so that any movement of the cutter-carriage is accompanied by a corresponding movement of the blank-spindle. In order to provide for cutting gears of different lead, it is also preferred to so construct the connecting-gearing that the ratio between the movement of the cutter and the movement of the blank may be varied. The preferred mechanism for effecting the results is as follows: The gear 31 on the screw 32 engages a gear 135, loosely mounted on shaft 21 and engaging a gear 136, secured to the end of a shaft 137, mounted in a suitable bearing in the frame. A gear 138 is secured to the outer end of shaft 137 and engages a gear 139, mounted on a stud 140, adjustably secured upon an arm 141, pivoted on the shaft 137 and held in place by bolts 142, the heads of which enter an annular T-groove in a boss 143, projecting from the frame. A second gear 144 is connected with the gear 139 and engages a gear 145, secured upon the end of a shaft 146, journaled in the frame and in a bracket 147, secured to the frame. The shaft 146 has a second gear 148 secured thereto, which is engaged by a gear 149, mounted on an arm 150, pivoted on shaft 146 and held in adjusted position by a nut 151 on the end of a stud 152, carried by said arm and projecting through a slot in the bracket 147. The gear 149 engages a gear 153, secured to a short shaft 154, to the other end of which is secured a bevel-gear 155, which engages a similar gear 156, connected to a shaft 157. The shaft 157, acting through mechanism to be described, drives the worm 158, which engages a worm-wheel 159, secured to the spindle 1. By changing the gears between the shafts 137 and 146 the ratio between the movement of the cutter-carriage and the movement of the blank-spindle may be varied. In order to obtain a more wide variation of this ratio than would be practicable with change-gearing between shafts 137 and 146, it is preferred to provide a second mechanism for connecting the shaft 146 with the shaft 157. In the form shown the gear 156 is loosely mounted on the shaft and is connected thereto by a clutch 160, which is keyed to the shaft. A worm-wheel 161 is also loosely mounted on the shaft 157 and is constructed to be connected to said shaft by the clutch 160. The worm-wheel is engaged by a worm 162, secured to a shaft 163, which also has a gear 164 secured thereto, which is engaged and driven by gear 154. By shifting the clutch from the gear 156 to the worm-wheel the relative movement of the blank-support will be reduced, and by thus providing two mechanisms for connecting the cutter-carriage and blank-support double the number of variations in the ratio between the movements of the cutter and blank may be had with the same set of change-gears. In order to adapt the machine for cutting either right or left handed spirals, means are provided for changing the direction of rotation of the blank-supporting spindle. This means consists, in the form shown, of a gear 165, mounted on the stud 152 and engaging the gear 148. To reverse the direction of rotation of the spindle, the arm 150 is swung to carry gear 149 out of engagement with gear 153 and gear 165 into engagement with gear 164. After each advance movement of the cutter the blank-support is indexed to bring it into position for the next cut, and it is preferred to so connect the indexing mechanism with the blank-support that said support may be indexed without disconnecting the cutter-carriage and blank-support. The preferred means for accomplishing this result is as follows: The upper end of shaft 157 has a bevel-gear 166 secured thereto, which engages bevel-gears 167, mounted in a frame or bearing-box 168, mounted to turn about the shaft 157. The gears 167 engage a bevel-gear 169, similar to gear 166, secured to the end of a shaft 170, which is in line with shaft 157. The shaft 170 passes through a sleeve 171, to which it is splined, which sleeve is mounted in a bracket 172, secured to block 2. The sleeve 171 is geared to the shaft 173, which carries the worm 158, by means of gears 174. The rotary frame 168 is provided with a worm-wheel 175, engaged by a worm 176 on a short shaft 177, which is connected with a second shaft 178 through gears 179. A gear 180 is secured to the end of shaft 178 and engages a gear 181, mounted on a stud adjustably secured to an arm which is adjustably pivoted on the shaft 182, heretofore referred to. A gear 184 is connected with gear 181 and engages a gear 183, secured to shaft 182. The frame 168 is normally held stationary by the worm 176 and worm-wheel 175, and the shaft 170 is driven through the bevel-gears 166 167 169, said shaft rotating at the same speed as shaft 157, but in the opposite direction, and driving the spindle 1 through the gears 174, worm 158, and worm-wheel 159. When shaft 112 is revolved by the mechanism heretofore described, this motion is transmitted, through the gearing referred to, to the frame 168, and the rotation of said frame will shift shaft 170 with relation to shaft 157, thus turning the blank into position for another cut. By changing the gears between shafts 182 and 178 the amount of movement of the blank may be varied for gears of different pitch. It will be noted that with this construction the connection between the cutter-carriage and blank-spindle is never broken and there is no possibility of the parts getting out of proper relation with each other. When the cutter-carriage returns after its forward or cutting movement, the cutter should be out of cutting relation with the blank, as otherwise the backlash in the mechanism for operating the blank-spindle and cutter-carriage would cause the cutter to injure the blank. This is preferably accomplished by moving the cutter away from the axis of the blank, and the preferred mechanism for thus moving the cutter is as follows: The cutter-supporting shaft is journaled in bearings 187 and 188, mounted upon a saddle 189, which is carried by the carriage 11. The saddle 189 is provided with a segmental shoe 190, which is guided in segmental guides 191 in the carriage 11, the center of said guides and shoe being preferably substantially in the same horizontal plane with the axis of the cutter-shaft.

The saddle 189 is also provided with two bearing-surfaces 192, which rest upon two blocks 193. The blocks 193 are carried by two eccentrics 194, formed on a shaft 195, journaled in the carriage 11. The shaft 195 is connected with a shaft 196, also journaled in the carriage by gears 197, and shaft 196 carries a spiral gear 198 at its outer end, which is engaged by a similar spiral gear 199. The gear 199 is mounted on shaft 54 between two arms 200, which extend laterally from carriage 11 and through which said shaft passes, said gear being keyed to turn with said shaft while being free to slide thereon as the carriage reciprocates. When the shaft 54 makes a half-revolution at the end of the advance movement of the carriage, as heretofore described, the shaft 195 is given a half-revolution and drops the blocks 193, thus dropping the cutter away from the blank. When the shaft 54 is turned at the end of the return movement of the carriage 11, the shaft 195 is returned to the position shown in Fig. 11 and the cutter is raised into cutting relation.

The cutter-spindle is provided with a shoulder 201, against which the cutter is clamped by means of a sleeve 202, which is keyed to the spindle and is forced against the cutter by a bolt 203, which screws into the end of spindle 10 and has a flange 204 engaging said sleeve. The bearing 188 is mounted to slide on the bed and may be moved back when the cutter is to be removed or placed on the shaft. The shaft 10 is driven through a bevel-gear 205, keyed on said shaft and provided with a hub 205', which passes through a bearing 206 on the bed 189. A nut 207 is screwed on the end of the hub of gear 205 and holds said gear in place in said bearing. It is important that the center of the cutter shall always lie in the same plane passing through the axis of the gear-blank. In the arrangement shown this plane is a vertical plane and the center of the cutter should therefore be vertically below the axis of the blank. In order that the cutter may be accurately adjusted to this position, the cutter-spindle is made longitudinally adjustable preferably in the following manner: The hub of gear 205 extends beyond the nut 207 and is slotted, as at 208. The end of shaft 10 is reduced in diameter to form a shoulder 209, against which two blocks 210 are clamped by a nut 211. These blocks project through the slots 208 and lie between two nuts 212 and 213 on the end of the hub 205'. By turning these nuts the cutter-spindle may be adjusted longitudinally. In order that the machine may be adapted for cutting gears of differing lead or differing diameter, it is preferred to so mount the cutter-shaft that the angle between the axis of said shaft and the axis of the blank may be changed. This adjustment is preferably accomplished by turning the cutter-shaft about an axis at right angles thereto, passing through the axis of the gear-blank. To accomplish this, the bearings for the cutter-spindle are formed on a swivel-head 214, provided with a depending cylindrical post 215, fitting within a circular hole in the saddle 189, the axis of said post being in a vertical line passing through the axis of the blank-support. The head 214 is clamped in its adjusted position by bolts 216, the heads of which lie in an annular undercut groove 217, formed in the saddle 189.

The mechanism for driving the cutter-spindle is so constructed that it will not interfere with the adjustment of said spindle and will act with equal efficiency to drive the cutter whatever the angle between the cutter-spindle and blank-spindle. In the preferred form of this mechanism the gear 205 meshes with a bevel-gear 218, which is mounted concentric with the axis about which the cutter-spindle is adjusted. The gear 218, as shown, is mounted on a journal 219, formed on the head 214, being held thereon by an annular plate 220. The gear 218 has a second series of teeth 221 formed thereon, the gear being in effect two bevel-gears integrally connected and forming a double bevel-gear. The teeth 221 are engaged by a bevel-gear 222, secured to the end of a shaft 223, journaled in the saddle 189 and having a worm-wheel 224 secured to its outer end. The worm-wheel 224 is engaged by a worm 225, connected with a shaft 226 by a key-and-slot connection and held between two arms 227, formed on a bearing 227', pivotally mounted on the shaft 223, projecting from the saddle 189. The shaft 226 is connected by means of a universal joint 228 to a short shaft 229, journaled in a bracket 230, secured to the frame. A bevel-gear 231 is secured to the end of shaft 229 and is engaged by a bevel-gear 232 on a shaft 233, which is driven from the transverse shaft 17 through gears 234. As the carriage 11 reciprocates the worm 225 slides back and forth on the shaft 226, and the universal joint 228 between said shaft and shaft 229 allows the rising and falling of the saddle 189.

The general operation of the machine is as follows: The cutter is adjusted to the proper angle for the diameter and lead of the gear to be cut, the gearing between the blank-spindle and cutter-carriage is adjusted for the lead, and the gearing between shafts 182 and 178 is adjusted for the pitch desired. The machine is then started by throwing the clutch 22 into engagement with the worm-wheel 20, when the carriage is advanced to feed the cutter through the blank, the blank-support being revolved as the cutter advances, so that a spiral groove is formed in the blank. When the pin 89 strikes the dog 87, the reversing mechanism is tripped and the shaft 54 makes a half-revolution, thus dropping the cutter away from the gear-blank and shifting the clutch into engagement with disk 23. The carriage now returns, and the spindle 1 rotates idly in the reverse direction. When the pin 89 strikes the dog 88, the reversing mechanism is again tripped and the shaft 54 makes another half-revolution. This movement of the shaft trips the indexing mechanism, raises the cutter into cutting relation, and reverses the movement of the cutter-carriage and blank-spindle. Thus the operation continues until all the teeth on the gear-blank have been cut, when the action of the cutter is stopped either by hand or automatically in any suitable manner.

While, as stated, the action of the cutter may be stopped by the operator when the gear has been completed, it is preferred to provide mechanism for automatically effecting this, and it is also preferred to use for this purpose a novel form of stop mechanism which embodies certain features of invention. It is usual to provide gear-cutting machines with devices for stopping the cutter-carriage, and these devices are commonly controlled by the blank-supporting spindle, so that the cutter-carriage is stopped after the blank-spindle has been indexed through a complete revolution. This form of stop mechanism is objectionable under certain conditions—for instance, when it is desired to index the blank a distance equal to two teeth after each cut and to revolve said blank through two revolutions in cutting the gear. This common manner of operating the stop mechanism is also impracticable on a spiral-gear cutter where the blank-spindle rotates during the cutting. With the present invention the stop mechanism is independent of the blank-support and is controlled by the number of reciprocations made by the cutter-carriage without regard to the movements of the blank.

In Figs. 16 and 17 is shown an embodiment of this part of the present invention in one of its preferred forms. With the form of mechanism shown the carriage is stopped by preventing the engagement of the clutch-sleeve 22 with the worm-wheel 20. This is accomplished by providing a stop 236, which is arranged to engage a shoulder 237, formed by the end of a slot 238 in the bar 48, and prevent the movement of the lever 47 under the action of spring 57. The stop 236 is in the form of a pin, which is provided with a notch 239 and is forced toward the bar 48 by a spring 240. A catch 241 engages the notch 239 and holds the stop 236 above bar 48. The pin 236 extends upward through the boss 242, in which it is mounted, and carries a gong 243, which normally stands above the path of a hammer 244, carried by bar 48, but is brought into position to be struck by said hammer when the pin is released and comes into position to engage the shoulder 237. The clutch 241 is secured to a rock-shaft 245, which has its lower end journaled in the bracket 61 and its upper end journaled in a plate 246, secured to the upper end of a column 247, rising from bracket 61. The shaft 245 is forced in a direction to hold the catch 241 engaged with the stop 236 by a torsional spring 248, one end of which is secured to the plate 246 and the other end to a collar 249, secured to said shaft. The collar 249 is provided with an inclined surface 250, arranged in the path of a pin 251, projecting from a tripping-plate 252, which is mounted to slide on the column 247.

The column 247 is slotted, and a ratchet-bar 253 is mounted to reciprocate in said slot and is engaged by a spring-pressed pawl 254, carried by the plate 252. The plate 252 also carries a second pawl 255, which engages a ratchet-rack 256, formed on the column 247. The ratchet-bar 253 may be reciprocated at each reciprocation of the carriage by any suitable mechanism and, as shown, is operated by a pin 257, carried by the disk 69, which pin strikes a block 258, secured to said bar. Each time the bar is raised the plate 252 is advanced, and the pawl 255 engages the next higher tooth in the rack 256 and prevents the return of the plate. When the pin strikes the collar 249, the shaft 245 is rocked and the catch 241 disengaged from the pin 236, which drops down into the slot 238 and carries the gong 243 into the path of the hammer 244. Now as the cam 52 shifts the bar 48 the gong will be struck by the hammer, and the shoulder 237 will be moved into engagement with the stop 236. As before stated, the cam 52 does not move the clutch 22 into engagement with the worm-wheel 20, and further movement of said clutch after the cam has completed its throw is prevented by the stop 236, so that the clutch is not engaged with said worm-wheel and the carriage is stopped. Since the disk 61 makes one revolution for each complete reciprocation of the cutter-carriage, the plate 252 will be advanced one tooth for each reciprocation of the cutter-carriage, and by placing the plate 252 a certain number of teeth down the rack 256 a corresponding number of teeth will be cut on the gear-blank before the cutter-carriage is automatically stopped. The column 247 may be provided with a scale 259 for convenience in setting the plate 252 for the number of teeth to be cut.

While it is preferred to mount the trip which controls the stop 236 in the manner shown, it will be understood that the manner of mounting the trip may be varied and that said trip may be advanced a step for each reciprocation of the carriage by other forms of mechanism.

What I claim as my invention, and desire to secure by Letters Patent, is—

1. In a spiral-gear cutter, the combination of a blank-support, a reciprocating cutter-carriage, a cutter supported thereon, mechanism for so rotating the blank-support during the cutting that a spiral groove is cut in the blank, and mechanism for moving one of said supports to throw the blank and cutter out of cutting relation on the return of the cutter-carriage, substantially as described.

2. In a spiral-gear cutter, the combination of a blank-support, a cutter-support, means for automatically reciprocating one of said supports parallel to the axis of the blank, means for rotating the blank during the cutting, whereby a spiral groove is cut in the blank and means for automatically moving the cutter out of cutting relation during the non-cutting movement of the reciprocating support, substantially as described.

3. In a spiral-gear cutter, the combination of a blank-support, a reciprocating cutter-carriage, a cutter supported thereon, mechanism for so rotating the blank-support during the cutting that a spiral groove is cut in the blank, and mechanism for moving the cutter out of cutting relation on the return of the cutter-carriage, substantially as described.

4. In a spiral-gear cutter, the combination of a blank-support, a cutter-support, mechanism for automatically reciprocating one of said supports, mechanism for rotating the blank-support during the action of the cutter, mechanism for moving one of said supports to throw the blank and cutter out of cutting relation during the non-cutting movement of the reciprocating support, and means for varying the ratio between the rotation of the blank-support and the advance movement of the reciprocating support, substantially as described.

5. In a spiral-gear cutter, the combination of a blank-support, a cutter-carriage, mechanism for reciprocating the cutter-carriage, mechanism for rotating the blank-support during the advance of the cutter-carriage, mechanism for throwing the blank and cutter out of cutting relation during the return of the cutter-carriage, and means for varying the ratio between the movements of the cutter-carriage and blank-support, substantially as described.

6. In a spiral-gear cutter, the combination of a blank-support, a cutter-carriage, mechanism for reciprocating the cutter-carriage, mechanism for rotating the blank-support during the advance of the cutter-carriage, mechanism for moving the cutter out of cutting relation during the return of the carriage, and means for varying the ratio between the movements of the cutter and blank-support, substantially as described.

7. In a spiral-gear cutter, the combination of a blank-support, a cutter-support, mechanism for reciprocating one of said supports, mechanism for rotating the blank-support during the cutting, mechanism for moving the cutter out of cutting relation on the return of the reciprocating support, and mechanism for indexing the blank-support without disconnecting the mechanism for rotating said support, substantially as described.

8. In a spiral-gear cutter, the combination of a blank-support, a cutter-support, mechanism for reciprocating one of said supports, mechanism for rotating the blank-support during the cutting, mechanism for throwing the blank and cutter out of cutting relation, and mechanism for indexing the blank-support without disconnecting the mechanism for rotating the same, substantially as described.

9. In a spiral-gear cutter, the combination of a blank-support, a cutter-support, mechanism for reciprocating one of said supports, mechanism for rotating the blank-support during the cutting, mechanism for moving the cutter out of cutting relation during the non-cutting movement of the reciprocating support, and mechanism for indexing the blank-support, substantially as described.

10. In a spiral-gear cutter, the combination of a blank-support, a cutter-support, mechanism for reciprocating one of said supports, mechanism for rotating the blank-support during the cutting, and mechanism for indexing the blank-support provided with means for varying the indexing for gears of differing pitch, substantially as described.

11. In a spiral-gear cutter, the combination of a blank-support, a cutter-carriage, mechanism for reciprocating the cutter-carriage, mechanism for rotating the blank-support during the advance of the cutter-carriage, and mechanism for indexing the blank-support provided with means for varying the indexing for gears of different pitch, substantially as described.

12. In a spiral-gear cutter, the combination of a blank-support, a reciprocating cutter-carriage, mechanism for reciprocating the cutter-carriage, mechanism for rotating the blank-support during the advance of the cutter-carriage, mechanism for moving the cutter out of cutting relation during the return of the cutter-carriage, and mechanism for indexing the blank-support, substantially as described.

13. In a spiral-gear cutter, the combination of a spindle for supporting the blank, a cutter-carriage, a rotary cutter-spindle supported by said carriage, mechanism for reciprocating said carriage parallel to the axis of the blank, mechanism for rotating the blank during the advance of the cutter-carriage, and means for adjusting the cutter-spindle about an axis passing through the axes of said spindles at right angles thereto, substantially as described.

14. In a spiral-gear cutter, the combination with a spindle for supporting the blank, a rotary cutter-spindle, mechanism advancing one of said spindles parallel to the axis of the blank-spindle, mechanism for rotating the blank-spindle during said advance movement, and means for adjusting the cutter-spindle about an axis passing through the center of the cutter at right angles to the axis of the cutter-spindle, substantially as described.

15. In a spiral-gear cutter, the combination of a spindle for supporting the blank, a spindle for supporting the cutter, mechanism for automatically reciprocating one of said spindles parallel to the axis of the blank, mechanism for rotating the blank-spindle during the cutting, mechanism for automatically throwing the blank and cutter out of cutting relation during the non-cutting movement of the reciprocating spindle, and means for varying the angle between the spindles, substantially as described.

16. In a spiral-gear cutter, the combination of a spindle for supporting the blank, a cutter-carriage, a rotary cutter-spindle supported by said carriage, mechanism for reciprocating said carriage parallel to the axis of the blank, mechanism for rotating the blank during the advance of the cutter-carriage, mechanism for automatically throwing the cutter and blank out of cutting relation during the return of the cutter-carriage, and means for varying the angle between the axes of said spindles, substantially as described.

17. In a spiral-gear cutter, the combination of an adjustable spindle for supporting the gear-blank, a spindle for supporting the cutter, mechanism for automatically reciprocating one of said spindles parallel to the axis of the blank, mechanism for rotating the blank during the cutting, mechanism for automatically throwing the blank and cutter out of cutting relation during the non-cutting movement of the reciprocating spindle, and means for varying the angle between the axes of said spindles, substantially as described.

18. In a spiral-gear cutter, the combination of an adjustable spindle for supporting the blank, a reciprocating cutter-carriage, mechanism for automatically reciprocating the same, a rotary cutter-spindle carried by said carriage, mechanism for rotating the blank during the cutting, mechanism for automatically throwing the cutter and blank out of cutting relation during the return of the cutter-carriage, and means for adjusting the cutter-spindle to vary the angle between the axes of said spindles, substantially as described.

19. In a spiral-gear cutter, the combination of a blank-support, a cutter-carriage, mechanism for reciprocating said carriage, a rotary cutter-support on said carriage having its axis at an angle to the axis of said blank-support and not intersecting the same, mechanism for driving said cutter-support, mechanism for rotating the blank-support during the advance of the cutter-carriage, and mechanism for moving one of said supports to throw the blank and cutter out of cutting relation during the return of the cutter-carriage, substantially as described.

20. In a spiral-gear cutter, the combination of a blank-support, a rotary cutter-support having its axis at an angle to the axis of the blank-support and not intersecting the same, mechanism for driving said cutter-support, mechanism for reciprocating one of said supports parallel to the axis of the blank, mechanism for rotating the blank during the cutting, and means for automatically moving the cutter out of cutting relation during the non-cutting movement of the reciprocating support, substantially as described.

21. In a spiral-gear cutter, the combination of a blank-support, a cutter-carriage, mechanism for reciprocating the same, a cutter-spindle thereon having its axis at an angle to the axis of the blank-support and not intersecting the same, mechanism for driving the cutter-spindle, mechanism for rotating the blank-support during the advance of the cutter-carriage, mechanism for moving the cutter out of cutting relation on the return of the cutter-carriage, substantially as described.

22. In a spiral-gear cutter, the combination of a blank-support, a rotary cutter-support having its axis at an angle to the axis of the blank and not intersecting the same, mechanism for driving said cutter-support, mechanism for automatically reciprocating one of said supports, mechanism for rotating the blank-support during the action of the cutter, mechanism for moving one of said supports to throw the blank and cutter out of cutting relation during the non-cutting movement of the reciprocating support, and means for varying the ratio between the rotation of the blank-support and the advance movement of the reciprocating support, substantially as described.

23. In a spiral-gear cutter, the combination of a blank-support, a cutter-carriage, a rotary cutter-spindle on said carriage having its axis at an angle to the axis of the blank-support and not intersecting the same, mechanism for driving the cutter-spindle, mechanism for reciprocating the cutter-carriage, mechanism for rotating the blank-support during the advance of the cutter-carriage, mechanism for throwing the blank and cutter out of cutting relation during the return of the cutter-carriage, and means for varying the ratio between the advance movement of the cutter-carriage and the rotation of the blank-support, substantially as described.

24. In a spiral-gear cutter, the combination of a blank-support, a cutter-carriage, a rotary cutter-spindle on said carriage having its axis at an angle to the axis of the blank-support and not intersecting the same, mechanism for driving said cutter-spindle, mechanism for reciprocating the cutter-carriage, mechanism for rotating the blank-support during the advance of the cutter-carriage, mechanism for moving the cutter out of cutting relation during the return of the cutter-carriage, and means for varying the ratio between the advance movement of the cutter-carriage and the rotation of the blank-support, substantially as described.

25. In a spiral-gear cutter, the combination of a blank-support, a rotary cutter-support having its axis at an angle to the axis of the blank-support and not intersecting the same, mechanism for reciprocating one of said supports parallel to the axis of the blank-support, mechanism for rotating the blank-support during the advance of the reciprocating support, mechanism for throwing the cutter and blank out of cutting relation on the return of the reciprocating support, and a train of gearing including a series of change-gears for indexing the blank-support, substantially as described.

26. In a spiral-gear cutter the combination of a blank-supporting spindle, a reciprocating cutter-carriage, a worm-wheel connected with said blank-spindle, a worm engaging the same, gearing for rotating said worm during the advance of the cutter-carriage, and mechanism for turning the worm to index the blank-spindle, substantially as described.

27. In a spiral-gear cutter, the combination of a blank-supporting spindle, a reciprocating cutter-carriage, a worm-wheel connected with said blank-spindle, a worm engaging the same, gearing for rotating said worm during the advance of the cutter-carriage embodying two gears in axial alinement, a frame carrying a gear engaging said gears, and means for turning said frame to index the blank-spindle, substantially as described.

28. In a spiral-gear cutter, the combination of a spindle for supporting the blank, a rotary cutter-spindle arranged with its axis at an angle to the axis of the blank-spindle and not intersecting the same, mechanism for driving the cutter-spindle, mechanism for reciprocating one of said spindles parallel to the axis of the blank-spindle, mechanism for rotating the blank-spindle during the advance of the reciprocating spindle, means for varying the angle between said spindles, and means for varying the ratio between the advance movement of the reciprocating spindle and the rotation of the blank-spindle, substantially as described.

29. In a spiral-gear cutter, the combination of a spindle for supporting the blank, a cutter-carriage, a rotary cutter-spindle supported by said carriage with its axis at an angle to the axis of the blank-spindle and not intersecting the same, mechanism for reciprocating the cutter-carriage parallel to the axis of the blank-spindle, mechanism for rotating the blank-spindle during the advance of the cutter-carriage, means for varying the angle between the axes of the cutter and blank spindles, and means for varying the ratio between the advance movement of the cutter-carriage and the rotation of the blank-spindle, substantially as described.

30. In a spiral-gear cutter, the combination of a spindle for supporting the blank, a swivel-head, a rotary cutter-spindle mounted thereon with its axis at an angle to the axis of the blank-spindle and not intersecting the same, mechanism for reciprocating one of said spindles parallel to the axis of the blank-spindle, mechanism for rotating the blank-spindle during the advance of the reciprocating spindle, and means for varying the ratio between the advance of the reciprocating spindle and the rotation of the blank-spindle, substantially as described.

31. In a spiral-gear cutter, the combination of a blank-support, a rotary cutter-support, mechanism for driving said cutter-support, mechanism for reciprocating one of said supports, mechanism for rotating the blank-support during the cutting, and mechanism for indexing the work-support provided with means for varying the indexing for gears of differing pitch, substantially as described.

32. In a spiral-gear cutter, the combination of a blank-support, a cutter-carriage, a cutter-spindle mounted thereon, mechanism for driving said spindle, mechanism for reciprocating said cutter-carriage, mechanism for rotating the blank-support during the advance of the cutter-carriage, mechanism for moving the cutter out of cutting relation during the return of the cutter-carriage, and mechanism for indexing the blank-support, substantially as described.

33. In a spiral-gear cutter, the combination of a blank-support, a rotary cutter-support, mechanism for driving said cutter-support, mechanism for reciprocating one of said supports, mechanism for rotating the blank during the cutting, mechanism for moving the cutter out of cutting relation on the non-cutting movement of the reciprocating support, and mechanism for indexing the blank-support, substantially as described.

34. In a spiral-gear cutter, the combination of a blank-support, a rotary cutter-support, mechanism for driving said cutter-support, mechanism for reciprocating one of said supports, mechanism for rotating the blank-support during the cutting, mechanism for throwing the blank and cutter out of cutting relation on the return of the reciprocating support, and mechanism for indexing the blank-support without disconnecting the mechanism for rotating said support during the cutting, substantially as described.

35. In a spiral-gear cutter, the combination of a spindle for supporting the blank, a cutter-carriage, a swivel-head carried by said carriage, a rotary cutter-spindle mounted on said head, mechanism for reciprocating said carriage, mechanism for rotating the blank during the advance of the cutter-carriage, and mechanism for automatically throwing the cutter and blank out of cutting relation during the return of the cutter-carriage, substantially as described.

36. In a spiral-gear cutter, the combination of a spindle for supporting the blank, a cutter-carriage, a reciprocating saddle mounted on said carriage, a swivel-head on said saddle, a rotary cutter-spindle on said head, mechanism for reciprocating said cutter-carriage, mechanism for rotating the blank during the advance of the cutter-carriage, and mechanism for operating said reciprocating saddle, substantially as described.

37. In a spiral-gear cutter, the combination of a blank-support, a cutter-support, mechanism for reciprocating one of said supports, mechanism for rotating the blank-support in either direction during the cutting, and mechanism for throwing the cutter and blank out of cutting relation during the non-cutting movement of the reciprocating support, substantially as described.

38. In a spiral-gear cutter, the combination of a blank-support, a cutter-carriage, a rotary cutter-spindle thereon, mechanism for reciprocating said cutter-carriage, mechanism for rotating said blank-support in either direction during the advance of the cutter-carriage, and mechanism for throwing the cutter and blank out of cutting relation during the return of the cutter-carriage, substantially as described.

39. In a spiral-gear cutter, the combination of a blank-support, a cutter-carriage, mechanism for reciprocating the cutter-carriage parallel to the axis of the blank-support, gearing connecting said carriage and the blank-support arranged to rotate said blank-support during the cutting in a definite ratio to the advance of the cutter-carriage, substantially as described.

40. In a spiral-gear cutter, the combination of a blank-support, a cutter-carriage, mechanism for reciprocating the cutter-carriage parallel to the axis of the blank-support, gearing connecting said cutter-carriage and blank-support through said reciprocating mechanism arranged to rotate said blank-support during the cutting in a definite ratio to the advance of the cutter-carriage, substantially as described.

41. In a spiral-gear cutter, the combination of a blank-support, a cutter-carriage, mechanism for reciprocating the cutter-carriage parallel to the axis of the blank-support, a driving-shaft geared to said cutter-carriage, mechanism for reversing the direction of rotation of said shaft, and gearing connecting said shaft and blank-support arranged to rotate said blank-support during the cutting, substantially as described.

42. In a gear-cutter, the combination of a cutter-carriage, a nut thereon, a screw-rod engaging said nut, a rotary shaft geared to said rod in advance of said nut, oppositely-moving drivers, and mechanism controlled by the movement of the carriage for alternately connecting said drivers to said shaft, substantially as described.

43. The combination with a carriage, of a shaft geared thereto, oppositely-moving drivers for said shaft, a clutch for alternately connecting said drivers to said shaft, cams for operating said clutch, and mechanism controlled by the carriage for intermittently rotating said cams, substantially as described.

44. The combination with a reciprocating carriage, of mechanism for reversing the movement of said carriage including rotary cams, a clutch connected to drive said cams, a cam carried by said clutch, an abutment for engaging said cam and holding said clutch out of operation, and mechanism controlled by the carriage for withdrawing said abutment, substantially as described.

45. The combination with a reciprocating carriage, of mechanism for reversing the movement of said carriage including rotary cams, a clutch for driving said cams, a cam carried by said clutch, an abutment for engaging said cam and holding said clutch out of operation, a catch for withdrawing said abutment, and a rocker operated by the carriage for operating said catch, substantially as described.

46. The combination with a clutch, of a cam carried thereby, an abutment for engaging said cam and holding said clutch out of operation, a catch for withdrawing said abutment, a spring-operated slide carrying said catch, means for operating said slide to withdraw said abutment, and means for positively returning said slide, substantially as described.

47. The combination with a clutch, of a cam carried thereby, an abutment for engaging said cam and holding said clutch out of operation, a slide, a catch carried by said slide and engaging said abutment, a rocker for operating said slide to withdraw said abutment, and a rocking cam for returning said slide, substantially as described.

48. The combination with a clutch, of a cam carried thereby, an abutment for engaging said cam and holding said clutch out of operation, a reciprocating slide, a latch carried thereby for engaging said abutment, mechanism for reciprocating the slide, means for disengaging the catch, and means for positively returning said catch into position to engage said abutment, substantially as described.

49. The combination with a clutch, of a cam carried thereby, an abutment for engaging said cam and holding said clutch out of operation, a reciprocating catch for withdrawing said abutment, and means carried with said clutch for disengaging said catch, substantially as described.

50. The combination with a clutch, of a cam carried thereby, an abutment for engaging said cam and holding said clutch out of operation, a slide, a catch carried by said slide for engaging said abutment, a rocker for operating the slide, and means carried with said clutch for disengaging said catch, substantially as described.

51. The combination with a clutch, of a cam carried thereby, an abutment for engaging said cam and holding said clutch out of engagement, means for withdrawing said abutment, a lever engaging said abutment, and a cam carried by said clutch for engaging said lever and returning said abutment, substantially as described.

52. The combination with a clutch, of a cam carried thereby, a pin for engaging said cam and holding the clutch out of operation, means for withdrawing said pin, and means operated by the movement of the clutch for returning said pin into the path of said cam, substantially as described.

53. The combination with a clutch, of a cam carried thereby, a spring-operated pin for engaging said cam and holding the clutch out of operation, means for withdrawing said pin, and means operated by the movement of the clutch for returning said pin into the path of said cam, substantially as described.

54. The combination with a reciprocating carriage, of mechanism for reversing said carriage including a clutch, a cam carried thereby, an abutment for engaging said cam and holding said clutch out of operation, a catch for withdrawing said abutment, mechanism operated by said carriage for operating said catch to withdraw said abutment, and means for disengaging the catch and returning said abutment, substantially as described.

55. The combination with a reciprocating carriage, of mechanism for reversing said carriage including a clutch, a cam carried thereby, an abutment for engaging said cam and holding said clutch out of operation, a catch for withdrawing said abutment, a slide carrying said catch, a rocker engaging said slide, a reversing-bar connected with said rocker, and operated by said carriage, and means for disengaging the catch and returning said abutment, substantially as described.

56. The combination with a clutch-sleeve, of a cam carried thereby, an abutment for engaging the cam and holding the clutch-sleeve out of operation, means for withdrawing and returning said abutment, an interrupted gear connected with said sleeve, a gear driven by said interrupted gear, a disk connected with said driven gear provided with segmental recesses, and a segment connected with said sleeve for engaging said recesses substantially as described.

57. The combination with a cutter-carriage, of a saddle thereon, a cutter-spindle carried by said saddle, and mechanism for rocking said saddle on said carriage to carry the cutter into and out of cutting relation, substantially as described.

58. The combination with a cutter-carriage provided with segmental guides, of a saddle provided with a segmental shoe engaging said guides, a cutter-spindle on said saddle, and mechanism for rocking said saddle in said guides to carry the cutter into and out of cutting relation, substantially as described.

59. The combination with a cutter-carriage, of a saddle thereon a cutter-spindle carried by said saddle, bearing-surfaces on said saddle, blocks engaging said surfaces and eccentrics for operating said blocks, substantially as described.

60. The combination with a cutter-carriage, of a saddle thereon, a cutter-spindle carried by said saddle, mechanism for reciprocating the carriage, and mechanism controlled by the movement of the carriage for rocking said saddle on said carriage to carry the cutter into and out of cutting relation, substantially as described.

61. The combination with a cutter-carriage, of a saddle thereon a cutter-spindle carried by said saddle, bearing-surfaces on said saddle, blocks engaging said bearing-surfaces, eccentrics for operating said blocks to rock said saddle, and mechanism for intermittently operating said eccentrics, substantially as described.

62. The combination with a reciprocating cutter-carriage, of a saddle mounted on said carriage, a cutter-spindle carried by said saddle, mechanism for raising and lowering said saddle, and mechanism for reversing the carriage connected with said raising and lowering mechanism, substantially as described.

63. The combination with a reciprocating cutter-carriage, of a saddle on said carriage, a swivel-head on said saddle, a cutter-spindle on said head, mechanism for driving said spindle, and mechanism for rocking said saddle on the carriage, substantially as described.

64. The combination with a blank-supporting spindle, of mechanism for indexing the same including, a clutch, a cam on said clutch, an arm carrying an abutment for engaging said cam and holding said clutch out of operation, a spring-pressed locking-arm for locking said clutch, said locking-arm being arranged to be engaged by the abutment-arm as the abutment is withdrawn, substantially as described.

65. The combination with a blank-spindle, of indexing-gearing connected therewith, a driver for said gearing, mechanism for intermittently rotating said driver, and mechanism connecting said driver and said gearing for starting said gearing with a gradually-accelerated motion and gradually decreasing the speed of said gearing at the end of the indexing, substantially as described.

66. The combination of a blank-spindle, a worm-wheel connected therewith to rotate the same, a worm engaging said worm-wheel, a system of change-gears connected with said worm, mechanism for starting said gearing with an accelerated speed and stopping said gearing with a retarded speed, and an intermittently-rotating driver for operating said gearing at intervals, substantially as described.

67. The combination of a blank-spindle, a worm-wheel connected therewith to rotate the same, a worm engaging said worm-wheel, a system of change-gears connected with said worm, mechanism for starting said gearing with an accelerated speed and stopping said gearing with a retarded speed, a clutch for driving said mechanism, and means for throwing said clutch into action at intervals, substantially as described.

68. The combination of a blank-spindle, indexing-gearing connected therewith, a shaft connected with said gearing, mechanism for starting said shaft with an accelerated speed and bringing said shaft to a state of rest at the end of a single revolution with a retarded speed, substantially as described.

69. The combination of a blank-spindle, indexing-gearing connected therewith, a shaft connected with said gearing, a driving-shaft which makes a plurality of revolutions in giving said former shaft a single revolution, and mechanism connecting said shafts for starting said former shaft with an accelerated speed and bringing said shaft to a state of rest at the end of a single revolution with a retarded speed, substantially as described.

70. The combination with a blank-spindle, of indexing-gearing connected therewith, mechanism for driving said gearing at a constant speed during the greater part of the indexing, and mechanism for gradually starting and stopping said gearing, substantially as described.

71. The combination with a blank-spindle, of indexing-gearing connected therewith, a gear for driving said gearing, a rotary pinion for driving said gear, means for starting said gear with a gradually-increasing speed and engaging said gear and pinion when both are moving at the same speed, and means for disengaging said gear and pinion and gradually bringing said gear to a state of rest, substantially as described.

72. The combination with a blank-spindle, of indexing-gearing connected therewith, a gear for driving said gearing, a mutilated gear connected therewith, a cam-tooth connected with said mutilated gear, a pinion engaging said mutilated gear, two abutments rotating with said pinion and arranged to engage opposite sides of said cam-tooth, and means for intermittently rotating said pinion, substantially as described.

73. The combination with a blank-spindle, of indexing-gearing connected therewith, a gear for driving said gearing, a gear connected therewith and having a blank space, a pinion for driving said latter gear, two diametrically-opposite abutments rotating with said pinion and arranged in line with the pitch-surface of said pinion, and a cam-tooth connected with said latter gear and arranged to lie between said abutments when the pinion is opposite the blank space in said gear, substantially as described.

74. The combination with a blank-spindle, of indexing-gearing connected therewith, a gear for driving said gearing, a gear connected therewith provided with a blank space, a pinion for driving said latter gear, two diametrically-opposite abutments rotating with said pinion and arranged in line with the pitch-surface of said pinion, a cam-tooth connected with said latter gear and arranged to be engaged by said abutments, a driver for said pinion, and means for intermittently throwing said driver into operation and for throwing said driver out of operation when the cam-tooth lies between said abutments, substantially as described.

75. The combination with a blank-spindle, of indexing-gearing connected therewith, a gear for driving said gearing, a gear connected therewith provided with a blank space, a pinion for driving said gear, two diametrically-opposite abutments arranged in line with the pitch-surface of said pinion and moving therewith, a cam-tooth connected with said pinion and arranged to be engaged by said abutments, a constantly-rotating shaft, a clutch for coupling said pinion to said shaft, means for engaging said clutch, and means for disengaging said clutch when said latter gear has made one revolution, substantially as described.

76. The combination with a blank-spindle, of index-gearing connected therewith, and means for driving said gearing comprising, a pinion 260, a gear 261, having a blank space 271, a cam-tooth 266 connected with gear 261 and having the flanks 267 and 268 and the faces 269 and 270, two abutments 264 and 265 for engaging said tooth connected with pinion 260, a constantly-running shaft and a clutch for coupling said shaft with said pinion, and means for disengaging said clutch when the cam-tooth 266 is between abutments 264 and 265, substantially as described.

77. The combination with a blank-supporting spindle, of gearing for rotating the same comprising two gears in axial alinement, a frame mounted to rotate about the axis of said gears, one or more gears mounted on said frame and connecting said former two gears, and means for intermittently rotating said frame, substantially as described.

78. The combination with a blank-supporting spindle, of gearing for rotating the same comprising a shaft geared to said spindle, a second shaft in line with said former shaft, gears on the adjacent ends of said shafts, a frame pivoted concentric with said shafts, one or more gears on said frame and connecting said gears, and gearing for intermittently rotating said frame, substantially as described.

79. The combination with a blank-supporting spindle, of gearing for rotating said spindle comprising a shaft geared to said spindle, a second shaft in line therewith, gears on the adjacent ends of said shafts, a frame journaled on said shafts, one or more gears carried by said frame and connecting said former gears, a worm-wheel on said frame, and an intermittently-operated worm engaging said worm-wheel, substantially as described.

80. The combination with a blank-supporting spindle, of two trains of gears for rotating said spindle in the same direction, and means for connecting either train of gears with said spindle and disconnecting the other, substantially as described.

81. The combination with a blank-supporting spindle, of a rotary cutter-spindle, mechanism for reciprocating one of said spindles, gearing connecting said reciprocating mechanism and the blank-supporting spindle for rotating the same, said gearing including two trains of gears, and means for connecting either train of gears with said blank-spindle and disconnecting the other train, substantially as described.

82. The combination with a blank-supporting spindle, of gearing for rotating said spindle including change-gears for varying the rotation of said spindle, two trains of gears leading between said change-gears and said spindle, and means for connecting either train of gears with said spindle and disconnecting the other train, substantially as described.

83. The combination of a blank-supporting spindle, a cutter-carriage, a shaft connected with said spindle to rotate the same, a train of gearing for driving said shaft during the advance of the cutter-carriage, a second train of gearing for driving said shaft in the same direction and at a reduced speed during the advance of the cutter-carriage, and means for connecting either of said trains of gearing to said shaft, substantially as described.

84. The combination of a blank-supporting spindle, a cutter-carriage, a shaft for advancing said cutter-carriage, a train of gearing for connecting said shaft with said spindle to rotate the same, a second train of gearing for connecting said shaft with said spindle to rotate the same in the same direction at a reduced speed, and means for throwing either train of gearing into operation, substantially as described.

85. The combination of a blank-supporting spindle, a cutter-carriage, a shaft for advancing said cutter-carriage, a system of change-gearing driven by said shaft, a train of gearing for connecting said change-gearing with said spindle for driving said spindle during the advance of the cutter, a second train of gearing for connecting said change-gearing with said spindle for driving said spindle in the same direction at a reduced speed, and means for throwing either of said trains of gearing into action, substantially as described.

86. The combination of a blank-supporting spindle, a cutter-carriage, a shaft for advancing said carriage, a system of change-gearing driven by said shaft, a shaft 157 connected with said spindle for rotating the same, a gear 156 on said shaft and driven from said change-gearing, a worm-wheel 161 on said shaft driven from said change-gearing at a reduced speed and in the same direction as gear 156, and a clutch 160 for connecting either gear 156 or worm-wheel 161 to said shaft, substantially as described.

87. The combination with a reciprocating carriage, of mechanism for reversing said carriage including a reciprocating part, means for returning said part to its normal position, and means for preventing successive movements of said reciprocating part in the same direction, substantially as described.

88. The combination with a reciprocating carriage, of mechanism for operating said carriage, a reversing-bar for controlling said operating mechanism normally held in mid-position, and means for preventing successive movements of said bar in the same direction, substantially as described.

89. The combination with a reciprocating carriage, of mechanism for reversing the carriage including a reversing-bar, dogs on said bar arranged to be engaged by the carriage, and means for preventing the operation of the reversing mechanism until the carriage has moved away from said dogs, substantially as described.

90. The combination with a reciprocating carriage, of mechanism for operating said carriage, a reversing-bar for controlling said operating mechanism, dogs for preventing the movement of said bar in either direction, and means for alternately rendering said dogs operative, substantially as described.

91. The combination with a reciprocating carriage, of mechanism for operating said carriage, a reversing-bar for controlling said operating mechanism, dogs for preventing the movement of said bar in either direction, and a cam connected with said bar for alternately operating said dogs, substantially as described.

92. The combination with a reciprocating carriage, of mechanism for reversing said carriage including, a clutch, a cam connected with said clutch, an abutment for engaging said cam and holding said clutch out of operation, a catch for engaging said abutment, means for disengaging said catch, mechanism for operating said catch including a reversing-bar, dogs on said bar engaged by the carriage, and means for preventing successive movements of said bar in the same direction, substantially as described.

93. The combination of a reciprocating part, dogs for preventing the movement of said part in either direction, and mechanism for alternately rendering said dogs operative, substantially as described.

94. The combination of a reciprocating part, dogs for preventing the movement of said part in either direction, a cam connected with said reciprocating part for operating said dogs, substantially as described.

95. The combination of a reciprocating part dogs for preventing the movement of said part in either direction, a plate for engaging said dogs, and a cam connected with said reciprocating part for reciprocating said plate, substantially as described.

96. The combination with a blank-support and mechanism for indexing the same, of a reciprocating cutter-carriage and mechanism independent of the blank-support for automatically stopping the cutter-carriage after a predetermined number of reciprocations, substantially as described.

97. The combination with a blank-support, of a reciprocating cutter-carriage, mechanism controlled by the carriage for indexing the blank-support, and mechanism independent of the blank-support for automatically stopping the cutter-carriage after a predetermined number of reciprocations, substantially as described.

98. The combination with a blank-support and mechanism for indexing the same, of a reciprocating cutter-carriage, mechanism for driving the same, a stop for preventing the operation of said driving mechanism, and mechanism independent of the blank-support and controlled by the reciprocation of the carriage for throwing said stop into operation, substantially as described.

99. The combination with a reciprocating carriage, of an adjustable trip, mechanism for advancing said trip a step at each reciprocation of the carriage, and mechanism controlled by said trip for stopping the carriage, substantially as described.

100. The combination with a reciprocating carriage, of mechanism for reciprocating said carriage, including a clutch, an adjustable trip, mechanism for advancing said trip a step at each reciprocation of the carriage, and a stop controlled by said trip for preventing the operation of said clutch, substantially as described.

101. The combination with a reciprocating carriage, of mechanism for operating the same, a stop for holding the operating mechanism out of action, a trip for controlling said stop, a pawl-and-ratchet mechanism for advancing said trip, and mechanism for operating said pawl-and-ratchet mechanism at each reciprocation of said carriage, substantially as described.

102. The combination with a driving mechanism, of a stop for preventing the operation of said driving mechanism, a trip for controlling said stop, a pawl-and-ratchet mechanism for operating said trip, said trip being adjustable in relation to said pawl-and-ratchet mechanism, substantially as described.

103. The combination with a driving mechanism, of a stop for preventing the operation of said driving mechanism, a tripping-plate for controlling said stop, two pawls carried by said plate, a stationary rack engaged by one pawl and a reciprocating ratchet-bar engaged by the other pawl, substantially as described.

104. The combination with a reciprocating carriage, of two oppositely-moving drivers for driving said carriage, a clutch for connecting said drivers with said carriage, a clutch-shifter, a stop for preventing the movement of said shifter, a catch for holding said stop out of operation, a trip for operating said catch, and a pawl-and-ratchet mechanism for advancing said trip, said trip being adjustable in relation to said pawl-and-ratchet mechanism, substantially as described.

CHARLES R. GABRIEL.

Witnesses:
IRA L. FISH,
R. A. BATES.